US008365287B2

(12) United States Patent
Yoo

(10) Patent No.: US 8,365,287 B2
(45) Date of Patent: Jan. 29, 2013

(54) ANTI-MALWARE SYSTEM AND OPERATING METHOD THEREOF

(75) Inventor: InSeon Yoo, Yongin-Si (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 13/164,770

(22) Filed: Jun. 20, 2011

(65) Prior Publication Data

US 2011/0314547 A1 Dec. 22, 2011

Related U.S. Application Data

(60) Provisional application No. 61/453,290, filed on Mar. 16, 2011.

(30) Foreign Application Priority Data

Jun. 18, 2010 (KR) .................. 10-2010-0057824
Jul. 21, 2010 (KR) .................. 10-2010-0070428
Jun. 3, 2011 (KR) .................. 10-2011-0054160

(51) Int. Cl.
*G06F 11/00* (2006.01)
*G06F 12/14* (2006.01)
*G06F 12/16* (2006.01)
*G06F 17/00* (2006.01)
*G06F 15/16* (2006.01)
*G06F 9/00* (2006.01)
*G08B 23/00* (2006.01)

(52) U.S. Cl. ............ 726/24; 726/22; 726/23; 726/25; 726/1; 726/13; 713/153; 713/154; 709/223; 709/224

(58) Field of Classification Search ............ 726/22–25, 726/1, 13; 713/153, 154; 709/223, 224
See application file for complete search history.

(56) References Cited

U.S. PATENT DOCUMENTS

| 6,205,552 | B1 * | 3/2001 | Fudge ........................... 726/25 |
| 7,254,562 | B2 * | 8/2007 | Hsu et al. ...................... 705/77 |
| 7,316,029 | B1 * | 1/2008 | Parker et al. ................... 726/13 |
| 7,418,253 | B2 * | 8/2008 | Kavanagh ...................... 455/410 |
| 7,490,350 | B1 | 2/2009 | Murotake et al. |
| 7,523,500 | B1 * | 4/2009 | Szor et al. ...................... 726/24 |
| 7,839,854 | B2 | 11/2010 | Alexander |
| 7,840,763 | B2 | 11/2010 | Murotake et al. |

(Continued)

FOREIGN PATENT DOCUMENTS

| JP | 61279969 A | 12/1986 |
| JP | 4150244 A | 5/1992 |

(Continued)

OTHER PUBLICATIONS

Lockwood, J., et al., "An Extensible, System-On-Programmable-Chip, Content-Aware Internet Firewall", 2003, pp. 1-10, Retrieved from the Internet on Jun. 9, 2011, <http://www.globalvelocity.info/public/whitepapers/content_aware_internet_firewall_fpga_global_velocity.pdf>.

(Continued)

*Primary Examiner* — Christian Laforgia
*Assistant Examiner* — Kari Schmidt
(74) *Attorney, Agent, or Firm* — Sughrue Mion, PLLC

(57) ABSTRACT

An anti-malware device and an operating method thereof are provided. The operating method includes: filtering by a first logic unit of the processor, input data based on a rule; and scanning by a second logic unit of the processor, for malware in the data, the filtering and the scanning being performed at the same time. Accordingly, the security of the packet data is tightened.

12 Claims, 20 Drawing Sheets

U.S. PATENT DOCUMENTS

| | | | |
|---|---|---|---|
| 8,079,084 B1* | 12/2011 | Huang et al. | 726/24 |
| 8,151,340 B2 | 4/2012 | Nakata | |
| 2004/0059943 A1 | 3/2004 | Marquet et al. | |
| 2005/0080888 A1* | 4/2005 | Walter | 709/223 |
| 2005/0216770 A1 | 9/2005 | Rowett et al. | |
| 2007/0011734 A1 | 1/2007 | Balakrishnan et al. | |
| 2007/0022479 A1 | 1/2007 | Sikdar et al. | |
| 2008/0163356 A1 | 7/2008 | Won-Jip et al. | |
| 2009/0016226 A1 | 1/2009 | LaVigne et al. | |
| 2009/0150996 A1 | 6/2009 | Haswell | |
| 2009/0240874 A1 | 9/2009 | Pong | |
| 2009/0249465 A1 | 10/2009 | Touboul | |
| 2009/0282486 A1* | 11/2009 | Zimmer et al. | 726/24 |
| 2009/0293126 A1 | 11/2009 | Archer et al. | |
| 2010/0138909 A1 | 6/2010 | Chen | |
| 2010/0281539 A1 | 11/2010 | Burns et al. | |

FOREIGN PATENT DOCUMENTS

| | | |
|---|---|---|
| JP | 2009-37598 A | 2/2009 |
| JP | 200965294 A | 3/2009 |
| KR | 2001-0105116 A | 11/2001 |
| KR | 20030030044 A | 4/2003 |
| KR | 10-2004-0090373 A | 10/2004 |
| KR | 10-2008-0056548 A | 6/2008 |
| KR | 10-2008-0074271 A | 8/2008 |
| KR | 10-2008-0113087 A | 12/2008 |

OTHER PUBLICATIONS

Ajami, R., "Embedded Network Firewall on FPGA", Nov. 2010, pp. 1-87, Retrieved from the Internet on Jun. 9, 2011, http://library2.usask.ca/theses/available/etd-11182010-144050/unrestricted/RaoufAjami_MScTesis_UofS.pdf>.

International Search Report issued Nov. 17, 2010 in International Application No. PCT/KR2010/001851.

Extended European Search Report issued Jan. 30, 2012, in Application No. 11170363.3.

Chen, et al.; "Antiworm NOU-Based Parallel Bloom Filters for TCP/IP Content Processing in Giga-Ethernet LAN" Local Computer Networks, Australia; Nov. 2005; Pates 748-755; ISBN 978-0-7695-2421-4.

Lockwood, et al.; "An Extensible, System-On-Programmable-Chip, Content-Aware Internet Firewall"; Springer Berlin Heidelberg, Berlin, Jan. 2003; vol. 2778, pp. 859-868; ISBN 978-3-54-045234-8.

Communication dated Jul. 24, 2012 issued by the Korean Intellectual Property Office in counterpart Korean Patent Application No. 10-2011-0054160.

Chen, et al., "AntiWorm NPU-based Parallel Bloom Filters for TCP/IP Content Processing in Giga-Ethernet LAN", Local Computer Networks, 2005, 8 pgs total.

Accardi, Kristen et al., "Network Processor Acceleration for a Linux* Netfilter Firewall," Symposium on Architecture for Networking and Communications Systems, Oct. 2005, pp. 115-123.

Andreasson, "Iptables Tutorial 1.2.2," The Netfilter webmaster, Aug. 2008, Ch.10, pp. 112-153.

Extended European Search Report, dated Jul. 26, 2012, issued by the European Patent Office in counterpart European Application No. 12159676.1.

Song, Haoyu, et al., "Snort Offloader: A Reconfigurable Hardware NIDS Filter," International Conference on Field Programmable Logic and Applications, Aug. 2005, pp. 493-498.

Yang, Yang et al., "A Software Implementation for a hybrid Firewall Using Linux Netfilter," 2010 Second WRI World Congress on Software Engineering, Dec. 2010, pp. 18-21.

Communication dated Oct. 26, 2012 issued by the Japanese Patent Office in counterpart Japanese Patent Application No. 2011-134940.

* cited by examiner

ANTI-MALWARE SYSTEM AND OPERATING METHOD THEREOF

CROSS-REFERENCE TO RELATED APPLICATIONS

This application claims priorities from Korean Patent Application No. 10-2010-57824, filed on Jun. 18, 2010, Korean Patent Application No. 10-2010-0070428, filed Jul. 21, 2010, and Korean Patent Application No. 10-2011-0054160, filed Jun. 3, 2011, in the Korean Intellectual Property Office, and claims the benefit of U.S. Provisional Application No. 61/453,290, filed Mar. 16, 2011, the disclosures of which are incorporated herein by reference in their entireties.

BACKGROUND

1. Field

Methods and apparatuses consistent with exemplary embodiments relate to an anti-malware system and an operating method thereof.

2. Description of the Related Art

Malware refers to software or a code that disturbs operation of a system or exposes the system to danger like viruses, adware, spyware, or Trojan horses. The malware infects a system through various ways. For example, the system may be infected by the malware just by opening an email or accessing a specific website.

An anti-malware system refers to a system that prevents a damage which may be caused by the malware and repairs the damage, and includes a firewall or a virus scanning engine.

With the development of communications, new malware has appeared and existing malware has become diversified. Therefore, the anti-malware system should detect new malware besides the existing malware and, thus, the system needs to operate with an updatable configuration in order to respond to such new malware. In particular, a mobile device, which has limited resources, requires an anti-malware system capable of detecting malware at a high speed using few resources.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an anti-malware system which can filter packet data at a high speed and an operating method thereof.

One or more exemplary embodiments also provide an anti-malware system which can perform a filtering operation and a virus scanning operation with respect to packet data simultaneously, and an operating method thereof.

According to an aspect of an exemplary embodiment, there is provided an operating method of an anti-malware system, the method including: filtering by a first logic unit of the processor, input data based on a rule; and scanning by a second logic unit of the processor, for malware in the data, the filtering and the scanning being performed at a same time.

According to an aspect of another exemplary embodiment, there is provided an anti-malware system including: a processor including: a firewall engine which includes first logic units that filter input data based on a rule, and determines whether the input data contains data to be scanned for malware; and an anti-virus engine which includes second logic units that scan for malware in the input data, if the firewall engine determines that the input data contains the data to be scanned for malware.

According to an aspect of another exemplary embodiment, there is provided a firewall engine which performs a filtering operation with respect to packet data based on a packet rule, and determines whether the packet data contains data to be scanned for malware.

According to one or more exemplary embodiments, the packet data is filtered at a high speed.

According to one or more exemplary embodiment, the filtering and the virus scanning are simultaneously performed with respect to the packet data.

Additional aspects and advantages of exemplary embodiments will be set forth in the detailed description, will be obvious from the detailed description, or may be learned by practicing exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Exemplary embodiments will now be described more fully with reference to the accompanying drawings to clarify aspects, features and advantages of the inventive concept. Exemplary embodiments may, however, be embodied in many different forms and should not be construed as limited to the exemplary embodiments set forth herein. Rather, these exemplary embodiments are provided so that this disclosure will be thorough and complete, and will fully convey the scope of the inventive concept to those of ordinary skill in the art. It will be understood that when an element, layer or region is referred to as being "on" another element, layer or region, the element, layer or region can be directly on another element, layer or region or intervening elements, layers or regions.

The terms used herein are for the purpose of describing particular exemplary embodiments only and are not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items. Moreover, expressions such as "at least one of," when preceding a list of elements, modify the entire list of elements and do not modify the individual elements of the list.

Figure 1:
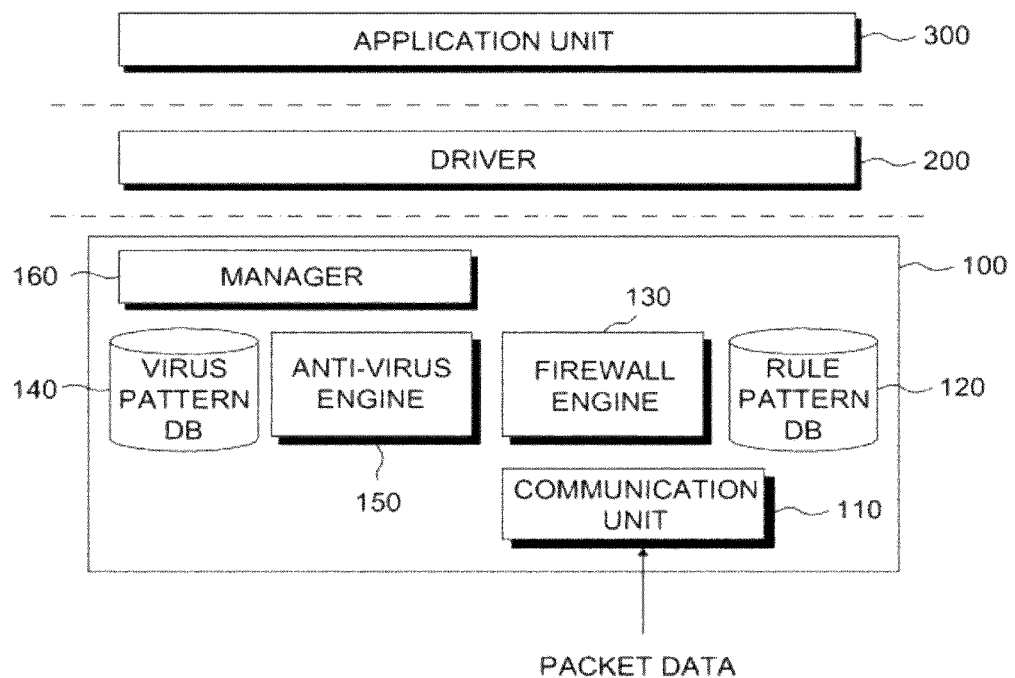
FIG. 1 is a block diagram illustrating an anti-malware system according to an exemplary embodiment.

FIG. 1 is a block diagram illustrating an anti-malware system according to an exemplary embodiment.

An anti-malware system 100 according to an exemplary embodiment may be realized as a system-on-chip (SOC) or may be mounted in a network communicable device such as a personal computer (PC) or a mobile device.

Referring to FIG. 1, the anti-malware system 100 includes a communication unit 110, a rule pattern database (DB) 120, a firewall engine 130, a virus pattern DB 140 (i.e., a malware pattern DB), and an anti-virus engine 150 (i.e., an anti-malware engine), and a manager 160. In an exemplary embodiment, the anti-virus engine 150 may include a buffer. As disclosed, the exemplary embodiments are merely exemplary in that the same exemplary embodiments may be used for malware other than viruses.

A driver 200 and an application unit 300 are also illustrated in FIG. 1 for convenience of explanation and they are elements of the device in which the anti-malware system 100 is mounted.

The driver 200 may support an interface between the anti-malware system 100 and the application unit 300. The driver 200 may guide a command of the application unit 300 and a command to update the rule pattern DB 120 or the virus pattern DB 140 to the manager 160.

The application unit 300 may include an anti-virus user interface (UI) application, a firewall UI application, a web browser and a network application. In this specification, the anti-virus UI application and the firewall UI application are collectively called an 'anti-malware (AM) application'. However, they are not so called if discriminating between the anti-virus UI application and the firewall UI application derives any benefit.

The communication unit 110 receives packet data from an external source through a network. To achieve this, the communication unit 110 may comprise at least one of a wireless fidelity (WiFi) module, a local area network (LAN) module, an over the air (OTA) module, a Bluetooth module, and a 4G module. If the communication unit 110 receives the packet data from the external source, the packet data is transmitted to the firewall engine 130. In an exemplary embodiment, the packet data may include a plurality of files.

The rule pattern DB 120 is a database including at least one packet rule. The packet rule is used to determine whether to block or pass the packet data transmitted from the external source. The packet rule may be set by a user directly or set to a default. The rule set by the user is converted into a format usable by the anti-malware system 100 and realized in the form of the rule pattern DB 120.

The firewall engine 130 may perform a filtering operation with respect to the packet data based on the packet rule and determine whether the packet data contains data to be scanned. In other words, according to an exemplary embodiment, the firewall engine 130 may perform both the filtering operation and the operation of determining whether the packet data contains data to be scanned. In the present exemplary embodiment, the anti-virus engine 150 may perform a virus scanning operation (i.e., a malware scanning operation) with respect to the packet data which has been determined to contain data to be scanned by the firewall engine 130. The virus scanning operation may be performed before or after the filtering operation is performed by the firewall engine 130 or at the same time as the filtering operation.

The firewall engine 130 may perform the filtering operation with respect to the packet data, but may not determine whether the packet data contains data to be scanned. In this embodiment, the anti-virus engine 150 performs the virus scanning operation with respect to all of the packet data without discriminating the packet data. Alternatively, the anti-virus engine 150 may perform the virus scanning operation with respect to the packet data before or after the filtering operation is performed.

The filtering operation of the firewall engine 130 may be performed in any one of a method well known in the related art, a method to be developed in future, or a method described in this specification. The virus scanning operation of the anti-virus engine 150 may be performed in any one of a method well known in the related art, a method to be developed in future, or a method described in this specification.

Hereinafter, the filtering operation of the firewall engine 130 according to an exemplary embodiment will be explained.

The firewall engine 130 may determine whether the packet data satisfies the packet rule by matching the packet data with the rule pattern DB 120. According to an exemplary embodiment, the firewall engine 130 may determine whether the packet data satisfies the packet rule by matching information (IP address, protocol, and port) included in a header of the packet data with the rule pattern DB 120. More specifically, the firewall engine 130 may determine whether the packet data satisfies the packet rule by matching the information (IP address, protocol, and port) included in the header of the packet data with the hash matcher table and the sub matcher table.

According to an exemplary embodiment, the firewall engine 130 may perform the matching operation using a hash value of the rule pattern and a hash value of the packet data. Albeit not shown, the anti-malware system 100 matches the packet data with the rule pattern DB 120 by applying a hash function. For example, the firewall engine 130 matches a hash value of the rule pattern and a hash value of at least a part of the packet data, and, only if the matching of the hash value is successful, the firewall engine 130 matches the rule pattern and the packet data. An example of the filtering operation of the firewall engine 130 will be explained in detail below with reference to FIGS. 11 to 15.

According to an exemplary embodiment, the firewall engine 130 may determine whether the packet data contains data to be scanned for viruses or not.

If the firewall engine 130 determines that the packet data contains the data to be scanned for viruses, the anti-virus engine 150 performs a virus scanning operation with respect to the corresponding data. This will be explained in detail with reference to FIGS. 4 and 5 below.

According to alternative exemplary embodiment, the firewall engine 130 may determine whether the packet data contains the data to be scanned for viruses or not and also determines a type of the data to be scanned for viruses. The type of the data to be scanned for viruses may be classified into file data and non-file data and the file data may be classified into script file data and general file data. These types of data are merely an example and any different type of data may be defined. The type of data classified by the firewall engine 130 will be explained in detail with reference to FIG. 6 below.

According to another alternative exemplary embodiment, the firewall engine 130 may determine whether the packet data contains the data to be scanned for viruses or not before the filtering operation for the packet data is performed. If the firewall engine 130 determines that the packet data contains the data to be scanned for viruses, the anti-virus engine 150 performs the virus scanning operation with respect to the packet data and the firewall engine 130 performs the filtering operation with respect to the packet data. The scanning operation and the filtering operation may not be necessarily performed at the same time and may be performed in sequence.

The virus pattern DB 140 is a database that includes at least one virus pattern. According to an exemplary embodiment, the virus pattern DB 140 may include a grammatically simple virus pattern and/or a grammatically complex virus pattern.

The anti-virus engine 150 determines whether malware exists in the data to be scanned for malware using the virus pattern DB 140. According to an exemplary embodiment, the data to be scanned may be the data that is received through the driver 200 or the packet data that is received from the firewall engine 130.

The anti-virus engine 150 may perform the virus scanning operation with respect to the packet data directly. However, the anti-virus engine 150 may need to perform pre-processing with respect to the packet data. For example, to perform the pre-processing, the anti-virus engine 150 may search a virus pattern of a script format in data corresponding to a minimum meaningful unit buffer. Another example of the pre-processing may be an operation of collecting packet data containing a file of a specific format and identifying the file format. The anti-virus engine 150 may perform the scanning operation to determine whether a virus pattern exists in the file corresponding to the minimum meaningful unit. Such pre-processing may be different according to a scanning scheme of the anti-virus engine 150 or a format of the virus pattern DB 140. However, in order to prevent the embodiments of the present disclosure from being obscured unnecessarily, it is assumed that necessary pre-processing is performed when the anti-virus engine 150 performs the scanning operation with respect to the packet data unless mentioned otherwise.

Referring back to FIG. 1, the anti-virus engine 150 may perform the virus scanning operation with respect to the packet data received through the communication unit 110 using the virus pattern DB 140.

According to an exemplary embodiment, the scanning operation of the anti-virus engine 150 may be performed at the same time as the filtering operation of the firewall engine 130 or before or after the filtering operation is performed. For example, with respect to the packet data received through the communication unit 110, the anti-virus engine 150 and the firewall engine 130 perform the scanning operation and the filtering operation simultaneously or separately.

The anti-virus engine 150 may perform the virus scanning operation with respect to data received through the driver 200 according to an instruction of the application unit 300.

According to an exemplary embodiment, the anti-virus engine 150 determines whether the packet data contains a virus by matching the packet data with the virus pattern DB 140.

According to an exemplary embodiment, the anti-virus engine 150 may perform the virus scanning operation using hash values. For example, the anti-virus engine 150 performs a hash value matching operation to match a hash value of the virus pattern and a hash value of the packet data, and, if the hash values are matched, performs a light pattern matching operation to match a part of the packet data and a part of the virus pattern. If the light pattern matching operation is successful, the anti-virus engine 150 performs an exact pattern matching operation to match the whole packet data and the whole virus pattern.

The manager 160 interprets a command received from the application unit 300, determines whether the command relates to the scanning operation or the filtering operation, and performs an operation corresponding to the command.

For example, if the manager 160 receives a virus pattern DB for updating from the application unit 300, the manager 160 may load the virus pattern DB for updating into the virus pattern DB 140.

Also, the manager 160 may receive a command to scan from the application unit 300 and may control the anti-virus engine 150 to perform the scanning operation according to the command.

Also, the manager 160 may receive a result of scanning by the anti-virus engine 150 from the anti-virus engine 150 and inform the application unit 300 of the result.

According to an exemplar embodiment, if the manger 160 receives a rule pattern list for updating from the application unit 300, the manager 160 may generate the rule pattern DB 120 based on the rule pattern list.

Also, the manager 160 may receive a result of filtering from the firewall engine 130 and inform the application unit 300 of the result.

In the present exemplary embodiment, the firewall engine 130 and the anti-virus engine 150 are managed by the one manager 160. However, this is merely an example and separate managers may be provided for each operation. For example, the manager 160 may include a firewall manager relating to the filtering operation, an anti-virus manager relating to the scanning operation, and a malware manager to manage the firewall manager and the anti-virus manager. In this case, the malware manager determines whether data or a command received from the application unit 300 relates to the firewall or the anti-virus and transmits the data or command to a corresponding manager.

For example, if the malware manager receives a rule pattern list from the application unit 300, the malware manager transmits the rule pattern list to the firewall manager. The firewall manager forms a rule pattern DB based on the rule pattern list. If the malware manager receives a command to scan, the malware manager transmits the command to scan to the anti-virus manager. The anti-virus manager instructs the anti-virus engine 150 to perform the scanning operation and accordingly the anti-virus engine 150 performs the scanning operation.

Figure 2:
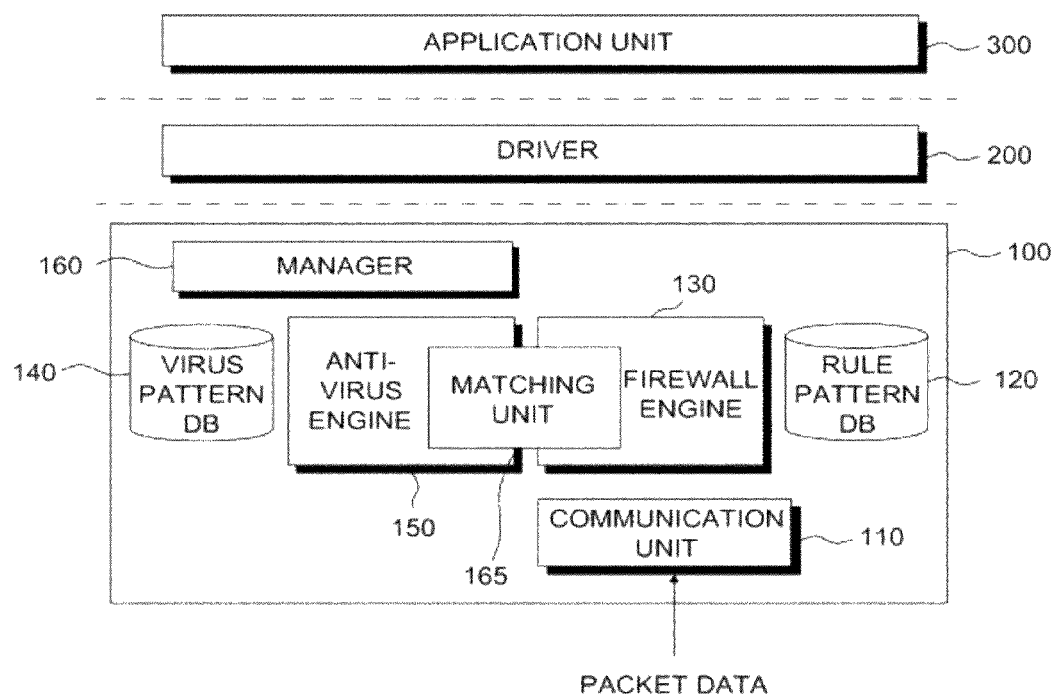
FIG. 2 is a block diagram illustrating an anti-malware system according to another exemplary embodiment.

FIG. 2 is a block diagram illustrating an anti-malware system according to another exemplary embodiment.

Referring to FIG. 2, an anti-malware system according to another exemplary embodiment is similar to that of FIG. 1. The same or similar elements are assigned the same reference numerals in FIGS. 1 and 2 and hereinafter a difference between FIGS. 1 and 2 will be mainly explained.

In this embodiment, the virus pattern matching operation of the anti-virus engine 150 and the rule pattern matching operation of the firewall engine 130 are performed by common hardware.

A matching unit 165 may match the virus pattern and the packet data and also match the rule pattern and the packet data. In other words, the matching unit 165 is operated as a part of the anti-virus engine 150 in some situation and is operated as a part of the firewall engine 130 in a different situation.

For example, if the matching unit 165 is operated as a part of the anti-virus engine 150, the matching unit 165 matches the virus pattern DB 140 and the data to be scanned. In this case, the matching unit 165 may perform the hash value matching operation, the light pattern matching operation, and the exact pattern matching operation between the virus pattern DB 140 and the data to be scanned.

On the other hand, if the matching unit 165 is operated as a part of the firewall engine 130, the matching unit 165 matches the rule pattern DB 120 and the packet data. In this case, the matching unit 165 may perform the hash value matching operation, the light pattern matching operation, and the exact pattern matching operation between the rule pattern DB 120 and the packet data. The hash value matching operation, the light pattern matching operation, and the exact pattern matching operation of the matching unit 165 will be explained in detail with reference to FIG. 7 below.

Figure 3:
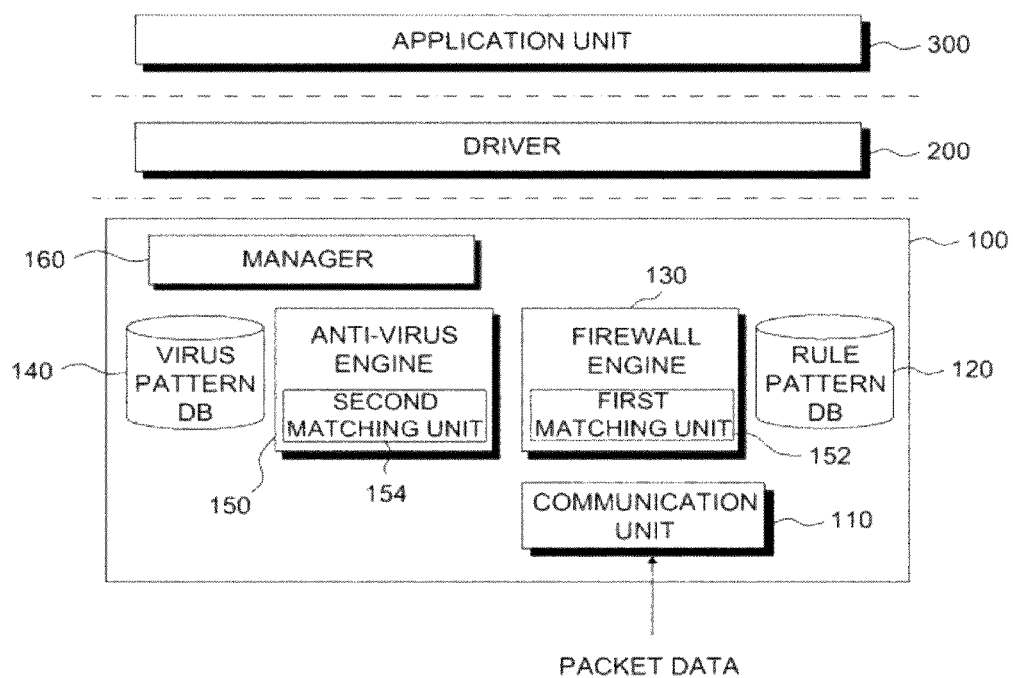
FIG. 3 is a block diagram illustrating an anti-malware system according to still another exemplary embodiment.

FIG. 3 is a block diagram illustrating an anti-malware system according to still another exemplary embodiment.

Referring to FIG. 3, an anti-malware system 100 according to still another exemplary embodiment includes similar elements to those of FIG. 1 or 2. Therefore, the same or similar elements are assigned the same reference numerals and hereinafter a difference will be mainly explained.

In this exemplary embodiment, the anti-virus engine 150 (i.e., anti-malware engine) and the firewall engine 130 include separate hardware to perform the virus pattern matching operation and the rule pattern matching operation, respectively. For example, the firewall engine 130 includes one or more first logic units to perform filtering, and the anti-virus engine 150 includes one or more second logic units to perform scanning.

Referring to FIG. 3, the firewall engine 130 includes a first matching unit 152 to perform the rule pattern matching operation and the anti-virus engine 150 includes a second matching unit 154 to perform the virus pattern matching operation.

The first matching unit 152 performs the matching operation between the rule pattern DB 120 and the packet data and the second matching unit 154 performs the matching operation between the virus pattern DB 140 and the packet data. Each of the first matching unit 152 and the second matching unit 156 may performs the hash value matching operation, the light pattern matching operation and the exact pattern matching operation. Furthermore, in the case of a grammatically complex pattern, a full pattern matching operation may be further performed.

Figure 4:
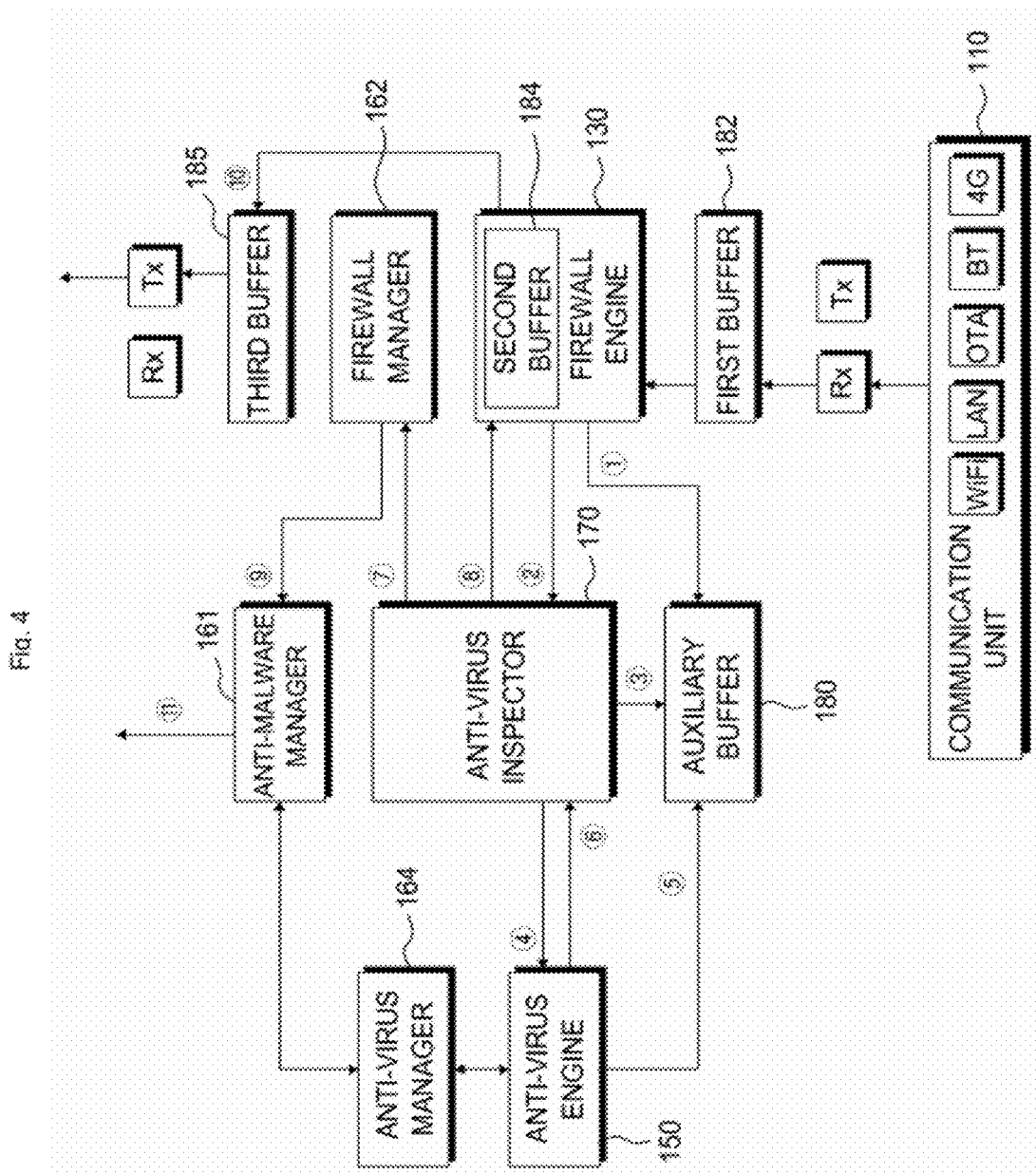
FIG. 4 is a view to explain an operation of an anti-malware system according to an exemplary embodiment.

FIG. 4 is a view to explain an operation of an anti-malware system according to an exemplary embodiment.

Referring to FIG. 4, an anti-malware system includes a communication unit 110, a firewall engine 130, an anti-virus engine 150, an anti-malware manager 161, a firewall manager 162, an anti-virus manager 164, an anti-virus inspector 170, an auxiliary buffer 180, a first buffer 182, a second buffer 184, a third buffer 185, a transmitter (TX), and a receiver (RX). The communication unit 110 may exchange data with an external source.

Hereinafter, a difference between the present exemplary embodiment and the aforementioned exemplary embodiments will be mainly described.

According to an exemplary embodiment, the anti-malware system performs a filtering operation and a virus scanning operation with respect to packet data simultaneously. The filtering operation and the virus scanning operation may be performed at the same time exactly or either one may be performed first.

If the firewall engine 130 receives the packet data, the firewall engine 130 determines whether the packet data contains data to be scanned for viruses, while or after performing the filtering operation. If it is determined that the packet data contains the data to be scanned for viruses, the firewall engine 130 does not transmit the packet data and temporarily holds the packet data. For example, the packet data is stored in a standby buffer.

The packet data stored in the standby buffer is on standby until a result of virus-scanning for the packet data is received.

According to an exemplary embodiment, if the firewall engine 130 receives a result that no virus exists in the packet data, the firewall engine 130 transmits the packet data being on standby to a transmission buffer. The packet data is transmitted to the transmission buffer based on the premise that the packet data does not violate a packet rule. The packet data transmitted to the transmission buffer may be transmitted to a corresponding application or to an external device through the transmitter (TX).

If the firewall engine 130 receives a result that a virus exists in the packet data, the firewall engine 130 does not transmit the packet data being on standby to the transmission buffer and discards it. In this embodiment, the firewall manager 162 may inform a user application of results of filtering and virus scanning with respect to the packet data.

According to an exemplary embodiment, if the anti-virus inspector 170 is notified by the firewall engine 130 that the packet data contains the data to be scanned for viruses, the anti-virus inspector 170 informs the anti-virus engine 150 of this. Also, the anti-virus inspector 170 receives a result of scanning from the anti-virus engine 150 and notifies the firewall engine 130 and the firewall manager 162 of the result. After that, the firewall engine 130 transmits the packet data to the transmission buffer or discards it based on the result of scanning.

Referring to FIG. 4, the operations of filtering and scanning the packet data simultaneously will be explained in detail.

In FIG. 4, operations among the elements of the anti-malware system 100 are numbered. The numbers are displayed only for convenience of explanation and do not mean an order of operations.

The firewall engine 130 reads out packet data stored in the first buffer 182 and performs the filtering operation with respect to the packet data. During or after the filtering operation, the firewall engine 130 determines whether the packet data contains data to be scanned for viruses or not, i.e., whether to scan the packet data.

The firewall engine 130 transmits the packet data to the third buffer 185, if it is determined that the packet data does not contain the data to be scanned, i.e., that scanning is not necessary.

According to an exemplary embodiment, the firewall engine 130 may determine whether to scan or not during the filtering operation. In this embodiment, if scanning is not necessary, the packet data may be transmitted to the third buffer 185 without being stored in the second buffer 184. Of course, the packet data may be transmitted to the third buffer 185 after being stored in the second buffer 184.

According to another exemplary embodiment, the firewall engine 130 may determine whether to scan or not after the filtering operation. In this embodiment, while the firewall engine 130 determines whether to scan or not, the packet data to be scanned may be stored in the second buffer 184. If scanning is not necessary, the firewall engine 130 transmits the packet data stored in the second buffer 184 to the third buffer 10.

If it is determined that the scanning is necessary, operations ①-⑪, which will be explained below, may be performed.

If it is determined that the scanning is necessary, the firewall engine 130 copies the packet data which is being filtered or stored in the second buffer 184 and stores the packet data in the auxiliary buffer 180 (operation ①). Also, the firewall engine 130 notifies the anti-virus inspector 170 that packet data to be scanned for viruses exists (operation ②).

The anti-virus inspector 170, which has been notified by the firewall engine 130 that data to be scanned for viruses exists, accesses the auxiliary buffer 186 and identifies whether the auxiliary buffer 186 stores the data to be scanned for viruses (operation ③), and notifies the anti-virus engine 150 that the data to be scanned for viruses exists (operation ④).

The anti-virus engine 150 accesses the auxiliary buffer 186 and reads out the packet data from the auxiliary buffer 186, and performs the virus scanning operation with respect to the packet data (operation ⑤).

The anti-virus engine 150 notifies the anti-virus inspector 170 of a result of virus scanning operation of the packet data (operation ⑥).

The anti-virus inspector 170 notifies the firewall manager 162 and the firewall engine 130 of the result of virus scanning operation which is received from the anti-virus engine 150 (operations ⑦ and ⑧).

The firewall manager 162 informs the anti-malware manager 161 of the result of virus scanning transmitted from the anti-virus inspector 170 and a result of filtering (operation ⑨). The result of filtering may be notified by the firewall engine 130.

The anti-malware manager 161 may transmit the result of scanning and the result of filtering notified by the firewall manager 162 to the application unit (operation ⑪).

If the firewall engine 130 is notified by the anti-virus inspector 170 that a virus exists as the result of scanning, the firewall engine 130 discards the packet data currently stored in the second buffer 184. If no virus exists, the firewall engine 130 transmits the packet data stored in the second buffer 184 to the third buffer 185 (operation ⑩).

In the above exemplary embodiment, the packet data stored in the standby buffer, i.e., the second buffer 184, is copied and stored in the auxiliary buffer 180, and the packet data stored in the auxiliary buffer 180 is scanned for viruses. However, this should not be considered as limiting.

For example, according to another exemplary embodiment, the auxiliary buffer 180 is not provided and the anti-virus engine 150 accesses the second buffer 184 directly, reads out the packet data stored in the second buffer 184, and scans the packet data for viruses.

Also, the second buffer 184 storing the packet data to be scanned for viruses is disposed inside the firewall engine 130. However, the second buffer 184 may be disposed outside the firewall engine 130.

Also, the anti-virus inspector 170 is used as a separate element, but the present disclosure can be realized without using the anti-virus inspector 170.

For example, the anti-virus manager 164 may be adapted to perform the operation of the anti-virus inspector 170. In this case, the firewall engine 130 instructs the anti-virus manager 164 to scan the packet data stored in the auxiliary buffer 180, and the anti-virus engine 150 performs the virus scanning operation according to the instruction of the anti-virus manager 164 and notifies the anti-virus manager 154 of a result of virus scanning After that, the anti-virus manager 164 notifies the anti-malware manager 161 and/or the firewall manager 162 of the result of scanning The next operations are the same as in the aforementioned exemplary embodiments.

The virus scanning operation of the anti-virus engine 150 and the filtering operation of the firewall engine 130 have been described above with reference to FIGS. 1 to 3. As in the exemplary embodiment of FIG. 3, the anti-virus engine 150 and the firewall engine 130 may include their respective matching units to perform their operations, or, as in the exemplary embodiment of FIG. 2, the anti-virus engine 150 and the firewall engine 130 may share a common matching unit to perform their operations.

Figure 5:
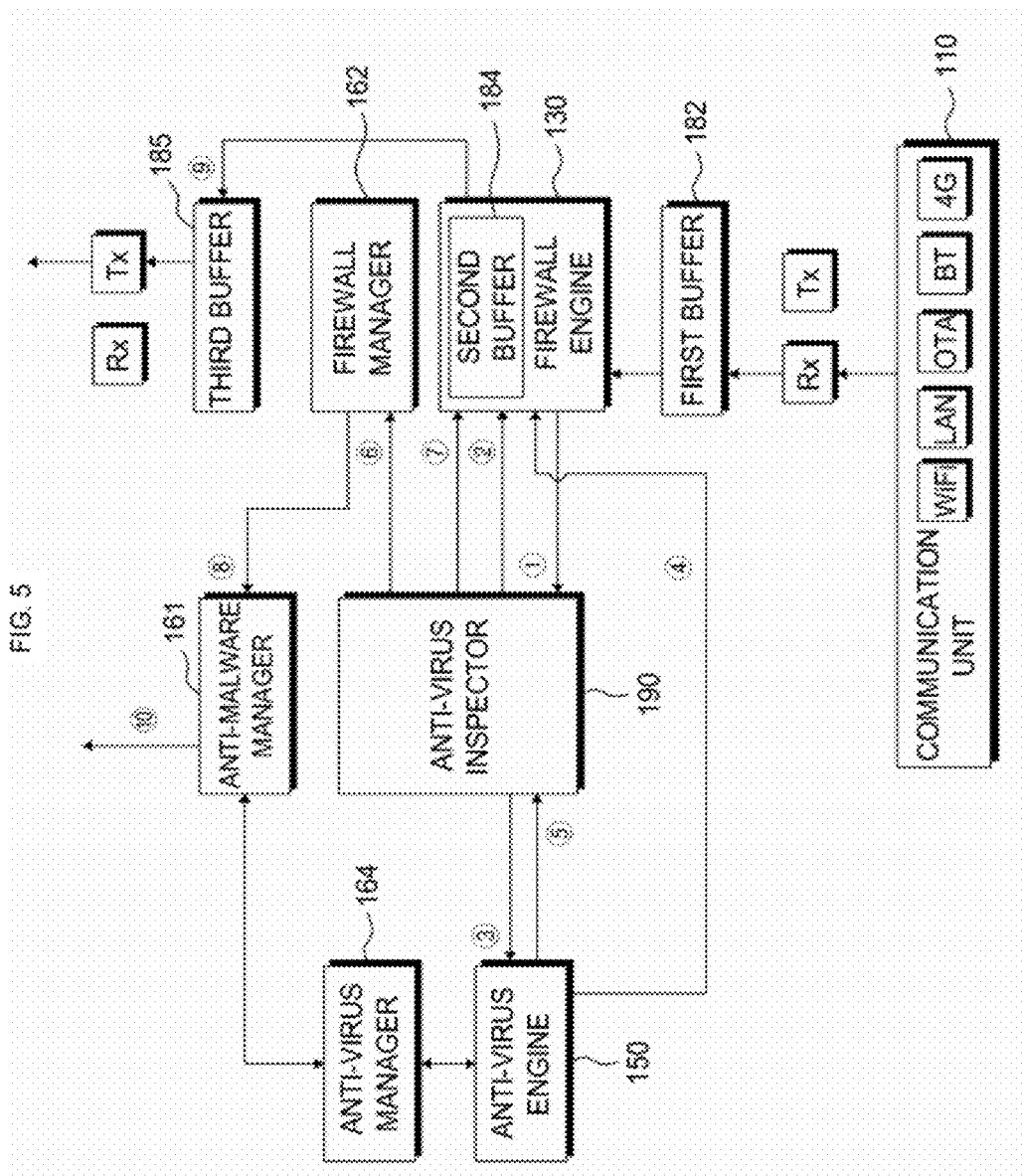
FIG. 5 is a view to explain an operation of an anti-malware system according to another exemplary embodiment.

FIG. 5 is a view to explain an operation of an anti-malware system according to another exemplary embodiment. Hereinafter, a difference between FIGS. 4 and 5 will be mainly explained.

Referring to FIG. 5, the firewall engine 130 determines whether packet data stored in the first buffer 182 contains data to be scanned for viruses, and, if it is determined that packet data contains the data to be scanned, the firewall engine 130 stores the packet data in the second buffer 184 and informs an anti-virus inspector 190 that the data to be scanned exists (operation ①). Next operations ② and ③ are the same as those of FIG. 4.

The anti-virus engine 150 reads out the packet data stored in the second buffer 184 (operation ④) and performs the virus scanning operation. Next operations ⑤ to ⑩ are the same as those of FIG. 4.

Figure 6:
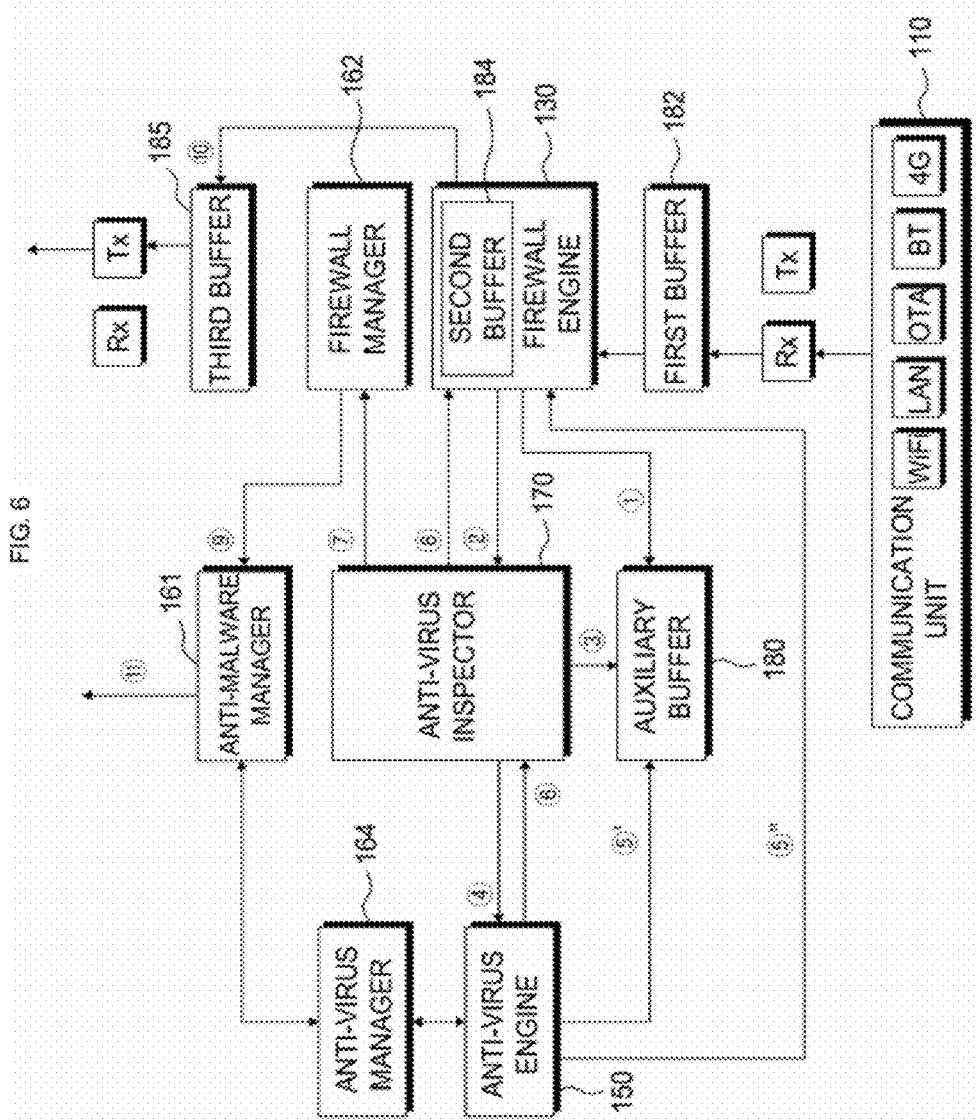
FIG. 6 is a view to explain an operation of an anti-malware system according to still another exemplary embodiment.

FIG. 6 is a view to explain an operation of an anti-malware system according to still another exemplary embodiment. Hereinafter, a difference between FIGS. 6 and 4 will be mainly described.

According to the exemplary embodiment of FIG. 6, the firewall engine 130 determines whether packet data contains data to be scanned or not, and, if it is determined that scanning is necessary as a result of determining, the firewall engine 130 determines what type of data is contained in the packet data for scanning (hereinafter, a type of scanning data). The firewall engine may include one or more first logic units.

The firewall engine 130 transmits the packet data to the third buffer 185 if it is determined that scanning is not necessary as the result of determining.

If it is determined that scanning is necessary, the firewall engine 130 determines the type of the scanning data contained in the packet data. If the type of the scanning data is a first type, the firewall engine 130 stores the packet data only in the second buffer 184 and notifies the anti-virus inspector 190 that the packet data is stored in the second buffer 184 (operation ②).

On the other hand, if the type of the scanning data is a second type, the firewall engine 130 also stores the packet data in the auxiliary buffer 180. Specifically, if the data to be scanned for viruses is of the second type, the firewall engine 130 stores the packet data containing the data to be scanned in the second buffer 184 and also stores the packet data in the auxiliary buffer 180. The firewall engine 130 notifies the anti-virus inspector 190 that the data to be scanned exits (operation ②).

The firewall engine 130 may also notify which buffer stores the data to be scanned, for example, whether the auxiliary buffer 180 stores the data to be scanned, when notifying the anti-virus inspector 170 that the data to be scanned exists.

The anti-virus inspector 170 notifies the anti-virus engine 150 that the data to scanned exists (operation ③). Also, the anti-virus inspector 170 may notify which buffer stores the data to be scanned.

The anti-virus engine 150 (i.e., anti-malware engine) reads out the data stored in the auxiliary buffer 180 or the second buffer 184 (operation ⑤' or ⑤") and performs the scanning operation with respect to the data, and notifies the anti-virus inspector 170 of a result of scanning (operation ⑥). The anti-virus inspector 170 notifies the firewall engine 130 of the result of scanning (operation ⑧), and the firewall engine 130 transmits the packet data stored in the second buffer 184 to the third buffer 185 or discards it according to the result of scanning The anti-virus engine 150 may include one or more second logic units.

The operations of the firewall manager 162 and the anti-malware manager 161 are the same as those of FIG. 4 or similar to them and thus a detailed description thereof is omitted.

In the present exemplary embodiment, there is no absolute criterion for classifying the type of the data into the first type and the second type. An appropriate criterion may be used. For example, the type of the data may be classified into the first type and the second type by a size of the data. In this case, data of a small size such as a script file may be classified into the first type and data of a big size may be classified into the second type, for example.

Figure 7:
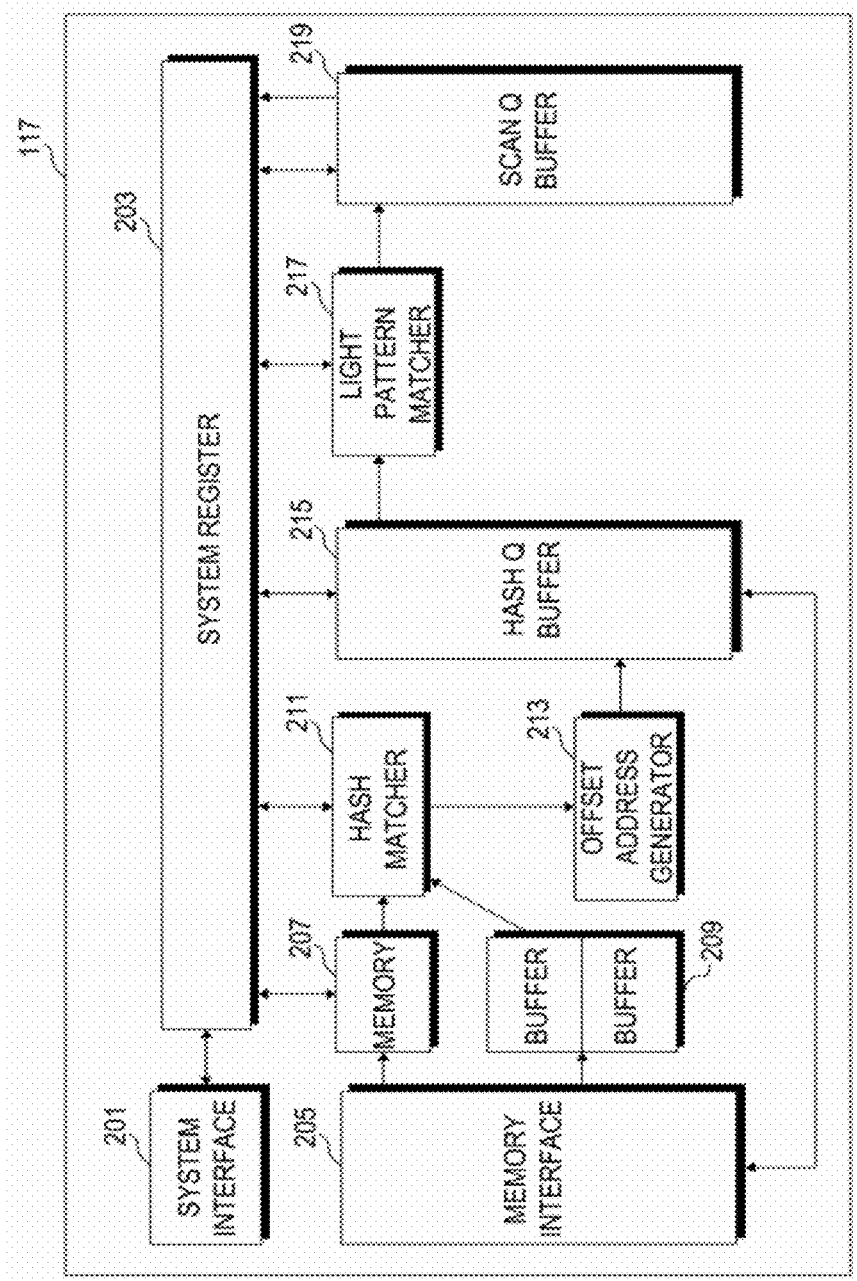
FIG. 7 is a block diagram illustrating a matching unit according to an exemplary embodiment.

FIG. 7 is a block diagram illustrating a matching unit according to an exemplary embodiment.

Referring to FIG. 7, a matching unit according to an exemplary embodiment includes a system interface 201, a system register 203, a memory interface 205, a memory 207, a buffer 209, a hash matcher 211, an offset address generator 213, a hash queue (Q) buffer 215, a light pattern matcher 217, and a scan Q buffer 219. According to an exemplary embodiment, the matching unit of FIG. 7 may be used as the matching unit of FIG. 2 or 3.

The system interface 201 supports an interface between the anti-malware system 100 and an external device, and the memory interface 205 is used to read out a DB or a file stored in the anti-malware system 100.

The memory 207 may store data (for example, a pattern hash value table) that is used by the hash matcher 211 to perform a hash matching operation.

The buffer 209 may store target data read out by the memory interface 205. In the present exemplary embodiment, the buffer 209 may be configured in a dual bank form. The target data is divided into sub-data as much as the buffer 209 can store and the sub-data is stored in the two buffers 209. If the matching unit of FIG. 7 is used as a part of the anti-virus engine, the target data may be data such as a file. On the other hand, if the matching unit of FIG. 7 is used as a part of the firewall engine, the target data may be packet data.

The hash matcher 211 matches a hash value of the target data and a hash matcher table 43. The hash matcher 211 stores target data, a hash value of which has been successfully matched in the hash Q buffer 215.

If the hash value matching is successful, the offset address generator 213 generates a memory address in which the hash value matched in the sub matcher table is stored.

The hash Q buffer 215 makes the address generated by the offset address generator 213 correspond to the target data and stores them.

The light pattern matcher 217 matches a part of the target data stored in the hash Q buffer 215 (for example, the middle value and the tail value of the target data) and a virus pattern (or an IP hash value of a rule pattern, a protocol hash value, or a middle value of an IP address) with each other. The light pattern matcher 217 stores the target data which has been successfully matched by the light pattern matching operation in the scan Q buffer 219.

The scan Q buffer 219 may store the target data which has been successfully matched by the light pattern matching operation.

If the matching unit 117 of FIG. 7 is used as a part of the anti-virus engine 150, the anti-virus engine 150 may perform an exact matching operation to match the target data stored in the scan Q buffer 219 and the virus pattern exactly, and performs a full pattern matching operation if the exact matching operation is successful. The full pattern matching operation is performed if the data has a grammatically complex pattern. In the case of data of a grammatically simple pattern, only the exact pattern matching operation is further performed.

On the other hand, if the matching unit 117 of FIG. 7 is used as a part of the firewall engine 130, the firewall engine 117 may perform an exact matching operation to match the target data stored in the scan Q buffer 219 and the rule pattern exactly.

Of the above-described matching operations, the virus pattern matching operation is described in detail in Korean Patent Application No. 10-2010-0049566 (filed on May 27, 2010), Korean Patent Application No. 10-2010-0052981 (filed on Jun. 4, 2010), and Korean Patent Application No. 10-2011-0049249 (filed on May 24, 2011) which were filed by the same assignee as that of this application and disclosures of these Korean Patent Applications are incorporated into this specification without conflicting with the present disclosure.

Figure 8:
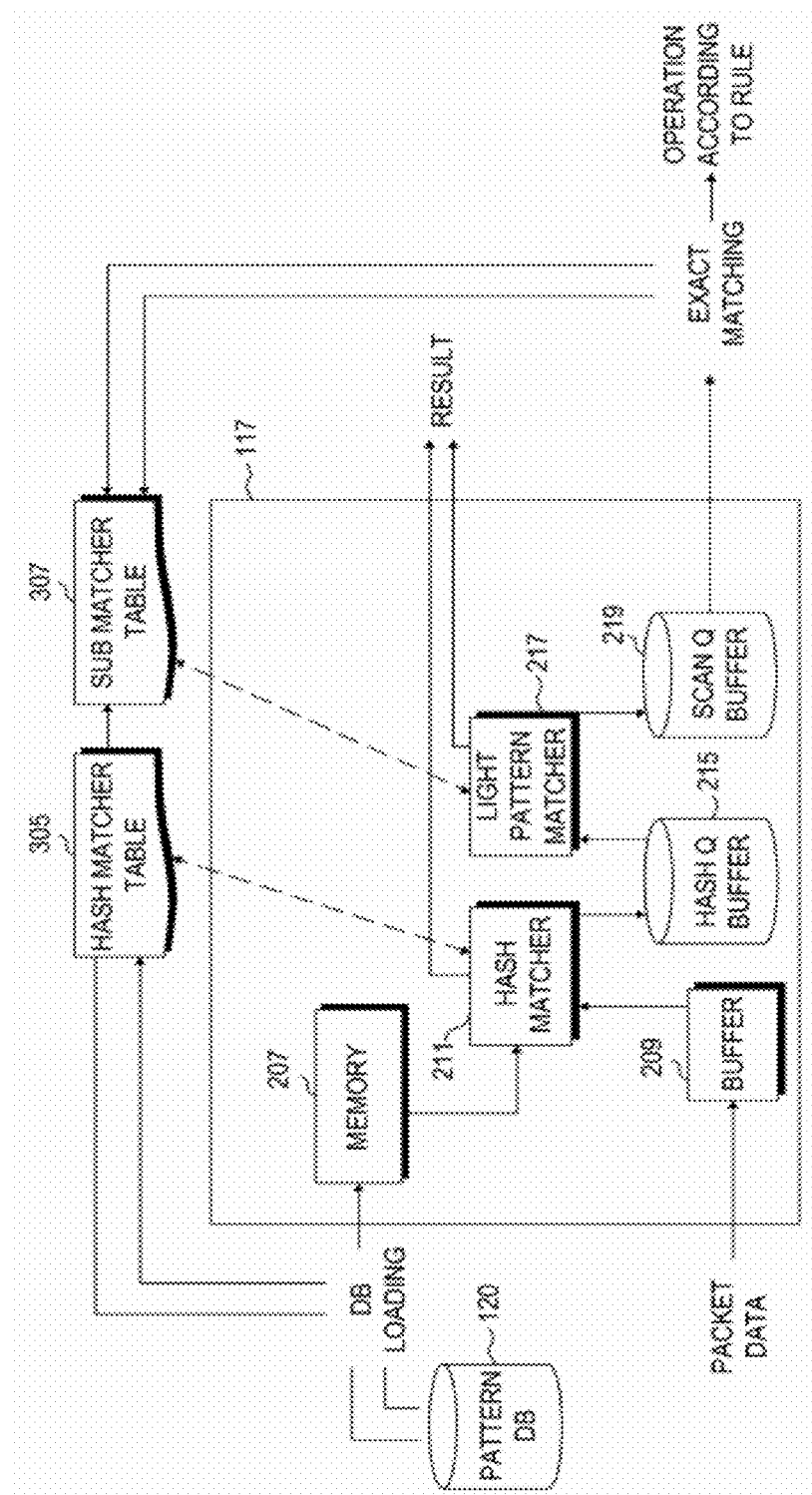
FIG. 8 is a view to explain a filtering operation of a firewall engine according to an exemplary embodiment.

FIG. 8 is a view to explain a filtering operation of the firewall engine according to an exemplary embodiment.

Referring to FIG. 8, the firewall engine 130 matches packet data and a rule pattern using the matching unit 117 configured by hardware. In this embodiment, the firewall engine 130 matches information included in a header of the packet data such as IP address, protocol, or port and the rule pattern.

Referring to FIG. 8, the rule pattern DB 120 may stored at least one packet rule and may comprise a direction of a packet, an IP address, a protocol, a port, permission/block information. The direction of the packet indicates a direction in which the packet is forwarded and is denoted by 'In', 'Out', and 'Both', and the IP address indicates a source IP address and a destination IP address, the IP address protocol indicates a type of a protocol used, such as Transmission Control Protocol(TCP), User Datagram Protocol(UDP), Internet Control Message Protocol(ICMP), and All, and the port indicates a port number to be set, and the permission/block information indicates whether to permit or block the packet.

In the present exemplary embodiment, the hash matcher 211 performs a hash value matching operation using the hash matcher table 305, and the light pattern matcher 217 performs a light pattern matching operation using the sub matcher table 307. The hash matcher 211 matches a hash value of data stored in the buffer 209 and the hash matcher table 305 in a hardware level. The data the hash value of which has been matched is stored in the hash Q buffer 215, and the light pattern matcher 217 matches the data stored in the hash Q buffer 215 and the sub matcher table in a hardware level. If matching by the light pattern matcher 217 is successful, the matched data is stored in the scan Q buffer 219, and the firewall engine 130 performs an exact pattern matching operation to determine whether the data stored in the scan Q buffer 219 and the whole rule pattern DB are identical to each other in a software level. After that, the firewall engine 130 passes or blocks the packet data according to a result of the exact pattern matching.

Referring to FIG. 8, if packet data to be filtered is received, the firewall engine 130 performs a packet classifying process with respect to the packet data first, and only if the packet data needs to be pattern-matched as a result of the packet classifying process, the firewall engine 130 matches the packet data and the rule pattern DB. The firewall engine 130 uses the matching unit 177 at least one time when performing the packet classifying process and also uses the matching unit 177 when matching the packet data and the rule pattern DB. A detailed description of this will be provided below with reference to FIGS. 11 to 15.

The configuration of the firewall engine 130 of FIG. 8 is merely an example and any configuration that can filter the packet data may be applied to the present disclosure.

Figure 9:
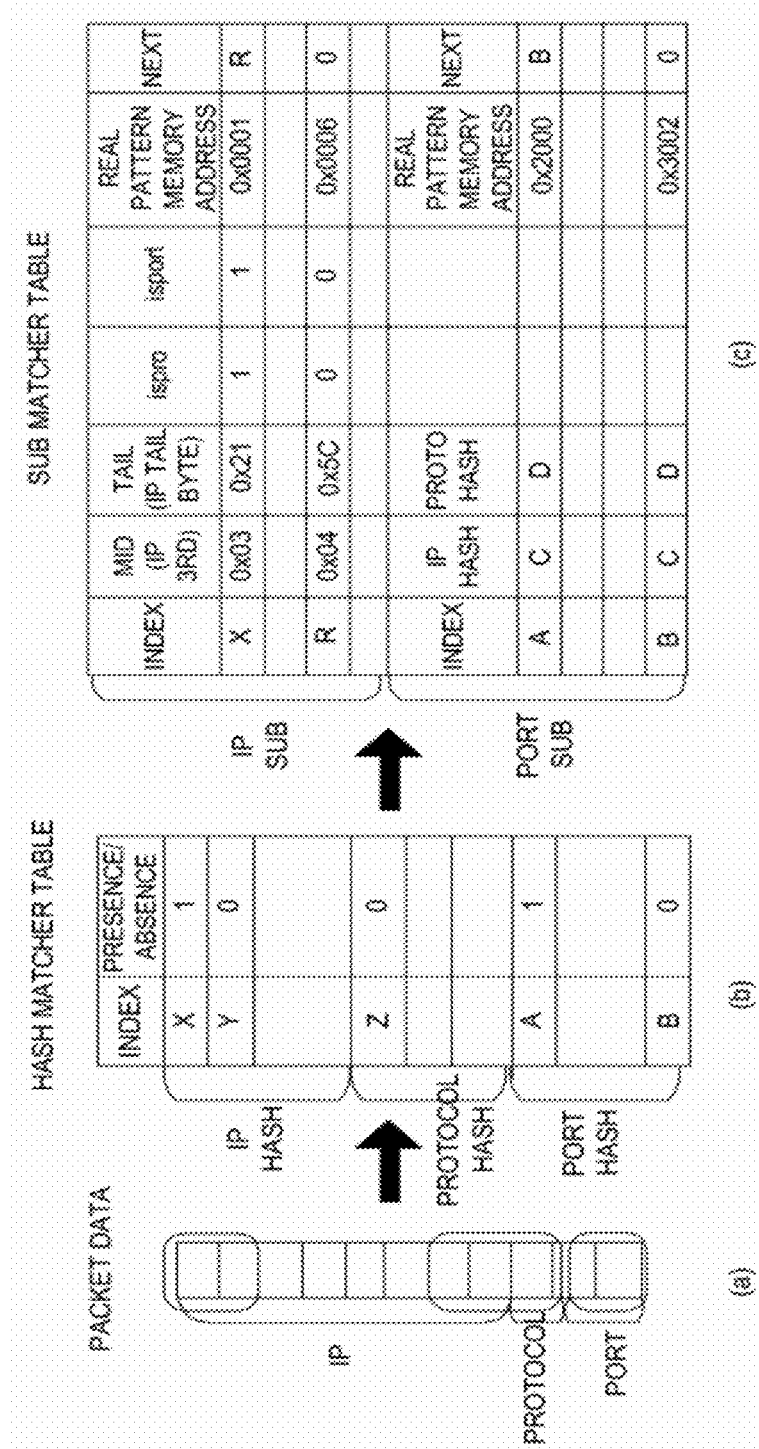
FIG. 9 is a view illustrating an example of a table used for the filtering operation of the firewall engine according to an exemplary embodiment.

FIG. 9 is a view illustrating a table used for the filtering operation of the firewall engine according to an exemplary embodiment.

Referring to FIG. 9, (a) shows an example of header information, (b) shows an example of a hash matcher table, and (c) shows an example of a sub-matcher table.

In the present exemplary embodiment, the firewall engine 130 may generate a hash matcher table using the rule pattern stored in the rule pattern DB 230. More specifically, the firewall engine 130 obtains all hash values for IP addresses included in the rule patterns by using a hash function and configures the hash matcher table of (b) of FIG. 9 based on the hash values.

Referring to (b) of FIG. 9, the hash matcher table includes an index item and a presence/absence item indicating whether an index exists or not. The index is determined by all hash values that can be obtained by the predetermined hash function, and, if an index value is the same as the hash value of the IP address of the rule pattern, the index is set to "1" in the presence/absence item.

The hash matcher table further includes a hash value for the protocol and a hash value for the port.

The firewall engine 130 may generate the sub matcher table. The firewall engine 130 newly generates a sub matcher table and a hash matcher table every time that the rule pattern DB is updated. The firewall engine 130 may generate the sub matcher table from the rule pattern DB and/or the hash matcher table.

The sub matcher table includes an index item, a mid item, a tail item, an ispro item, an isport item, a real pattern memory address item, and a next item.

The sub matcher table will be explained with reference to (c) of FIG. 9 for convenience of understanding. According to the first record of (c) of FIG. 9, the index item is 'X', the mid item is '0x03', the tail item is '0x21', the ispro item is '1', the isport item is '1', the real pattern memory address item is '0x0001', and the next item is 'R'.

The values shown in the index item of the sub matcher table are values having a value '1' in the presence/absence item of the hash matcher table. In other words, the index 'X' of the first record of the sub matcher table also exists in the hash matcher table and has a value of '1' in the presence/absence item. On the other hand, the value 'R' does not exist in the hash matcher table but exists in the sub matcher table as an index value. This value is provided in case that rule patterns are different but hash values of IP address are the same, in other words, in case that a hash collision occurs. For example, a rule pattern A and a rule pattern B have different IP addresses, but a hash value of the IP address of the rule pattern A and a hash value of the IP address of the rule pattern B are the same (for example, a hash value of 'X') (i.e., a hash collision). In this case, as shown in the sub matcher table of (c) of FIG. 9, the hash value of the IP address of the rule pattern A is written as 'X' and the hash value of the IP address of the rule pattern B is written as 'R', and 'R' is written in the next item. If sub matching is not successful as a result of performing sub-matching with respect to the record of the index 'X', the sub matching for the record of the index 'R' is performed again. According to an exemplary embodiment, the 'R' written in the next item may be defined as a difference between a memory address in which the record of the index 'X' is stored and a memory address in which the record of the index 'R' is stored.

The values written in the index item of the sub matcher table (for example, X, A, or B) may be obtained from the hash matcher table or may be obtained directly from the rule pattern DB without using the hash matcher table. In other words, the hash values for the IP addresses owned by the rule patterns of the rule pattern DB may be written as indexes in the sub matcher table.

The index 'X' of the first record of the sub matcher table is a hash value for an IP address of a rule pattern stored in a memory address ('0x0001') designated by the real pattern memory address item.

The value '0x03' in the mid item of the sub matcher table is a value of a middle byte of the IP address of the rule pattern stored in the memory address ('0x0001') designated by the real pattern memory address item.

The value '0x21' in the tail item of the sub matcher table is a value of a tail byte of the IP address of the rule pattern stored in the memory address ('0x0001') designated by the real pattern memory address item.

The value '1' in the ispro item of the sub matcher table means that the rule pattern stored in the memory address ('0x0001') designated by the real pattern memory address item is applied to all protocols.

The value '1' in the isport item of the sub matcher table indicates that the rule pattern stored in the memory address ('0x0001') designated by the real pattern memory address item is applied to all ports.

The above explanation has been made for an IP matching process and is about the area marked 'IP sub' in the sub matcher table of (c) of FIG. 9. Hereinafter, the area marked 'Port sub' in the sub matcher table of (c) of FIG. 9 will be explained. Values in this area are used for a port matching process.

An index 'A' in the sub matcher table of (c) of FIG. 9 means that a hash value of a port of a rule pattern stored in a memory address ('0x2000') designated by the real pattern memory address item is applied to all ports. A value 'C' in an IP hash item is a hash value of an IP address included in the rule pattern stored in the memory address ('0x2000') designated b the real pattern memory address item. A value 'D' in a proto hash item is a hash value of a port included in the rule pattern stored in the memory address ('0x2000') designated by the real pattern memory address. An index 'B' is provided in case that IP hash values collide.

The above-described hash matcher table and the sub matcher table may be generated by the firewall engine 130 and may also be generated by a separately provided element other than the firewall engine 130.

Figure 10:
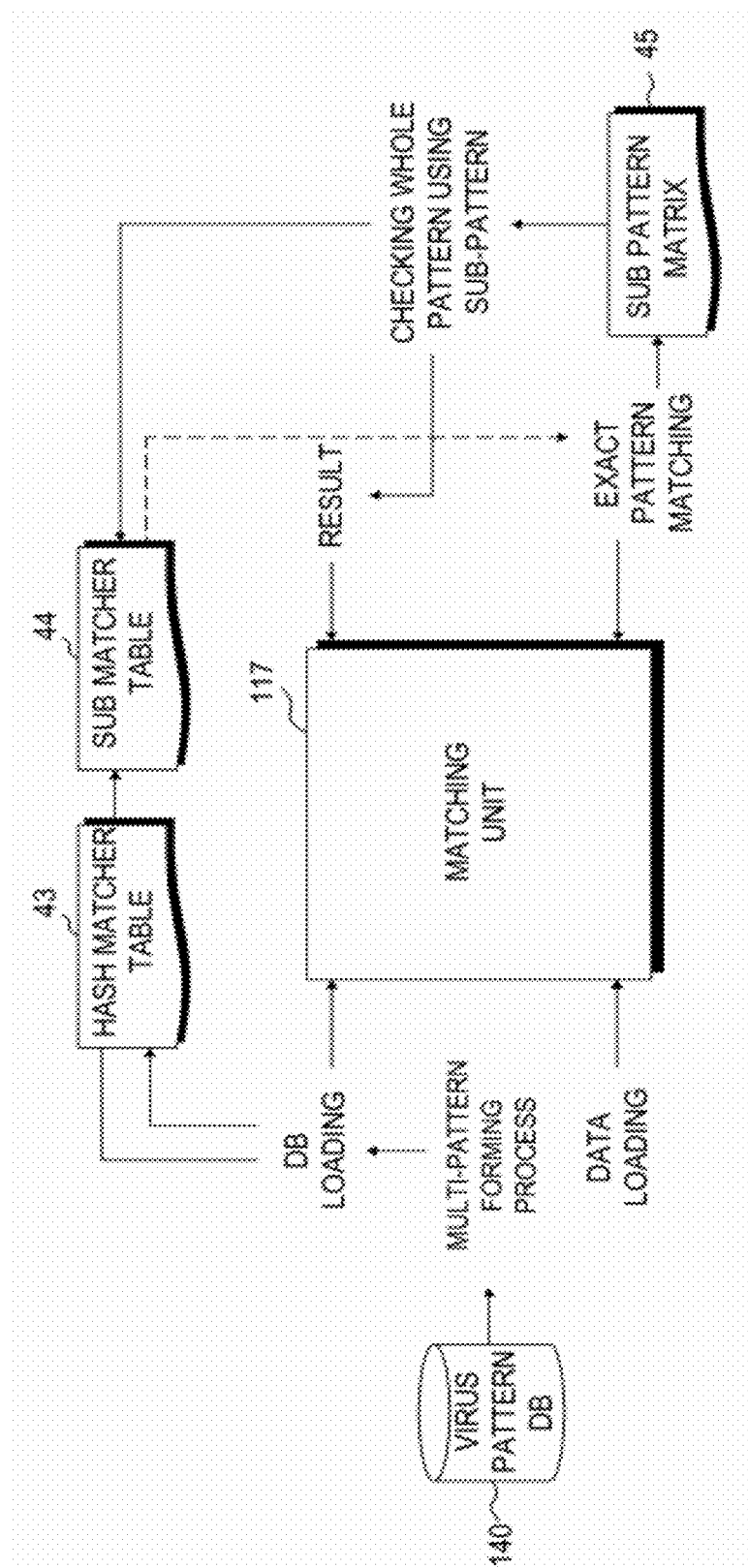
FIG. 10 is a view to explain a scanning operation of an anti-virus engine according to an exemplary embodiment.

FIG. 10 is a view to explain another matching operation in the anti-malware system according to an exemplary embodiment.

Referring to FIG. 10, the anti-virus engine 150 performs a hash value matching operation and a light pattern matching operation. If the light pattern matching operation is successful, the anti-virus engine 150 performs an exact pattern matching operation to determine whether a virus pattern is identical to target data (packet data) exactly. The anti-virus engine 150 determines whether the target data is infected by a virus according to a result of exact pattern matching.

Referring to FIG. 10, the virus pattern stored in the virus pattern DB 120 is divided into a plurality of sub-patterns ('multi-pattern forming process') and the plurality of sub-patterns are loaded into a DB. The 'multi-pattern forming process' is a process of dividing each virus pattern into a plurality of sub-patterns according to a corresponding matcher before the virus pattern DB 140 is loaded into the memory by the anti-virus manager. The plurality of sub-patterns is loaded into the memory by a module for 'DB loading'.

If the virus pattern DB is loaded, the matching unit 177 of the anti-virus engine 150 performs the matching operation. The matching unit 177 performs the hash value matching operation and the light pattern matching operation. The operation of the matching unit 177 has been described above with reference to FIG. 7 and thus an explanation thereof is omitted.

Figure 11:
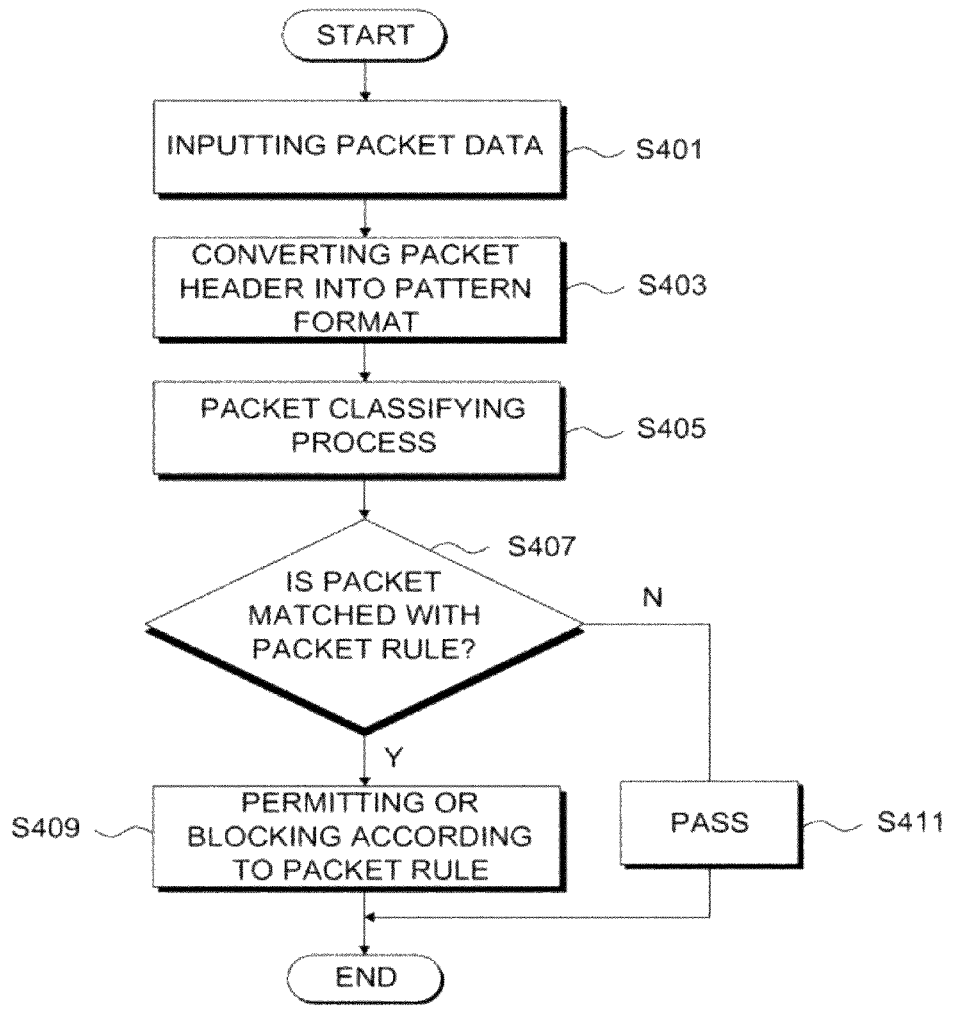
FIG. 11 is a flowchart illustrating a packet filtering method according to an exemplary embodiment.

FIG. 11 is a flowchart illustrating a packet filtering method according to an exemplary embodiment.

Referring to FIG. 11, if the firewall engine 130 receives packet data to be filtered (operation S401), a header of the packet data is converted into a pattern format (operation S403). A packet classifying process is performed with respect to the packet data using header information of the packet data (operation S405). The pattern format in operation S403 may be a format as shown in (a) of FIG. 9. In the present exemplary embodiment, operation S403 is merely an example and the header of the packet data to be filtered may not be necessarily converted into the format as shown in (a) of FIG. 9. For example, the exemplary embodiment of FIG. 11 may include an operation of extracting header information from the packet data instead of operation S403 and may perform operation S405 using the header information. The packet classifying process will be explained in detail with reference to FIG. 12 below.

If the packet classifying process for the packet data is completed, it is determined whether pattern matching operation S407 will be performed or not. In other words, the firewall engine 130 does not perform the pattern matching operation with respect to all of the packet data, and determines whether to perform the pattern matching operation with respect to the packet data by applying the packet classifying process (operation S405) to the packet data. Only if it is determined that the pattern matching operation will be performed, the pattern matching operation is performed. In the pattern matching operation S407, the packet data is matched with the rule pattern stored in the rule pattern DB 120. Accordingly, it is checked whether the packet data is matched with the rule pattern or not (operation S407).

For example, the firewall engine 130 checks whether header information of the packet data (IP address, port number, or protocol) is matched with the rule pattern using the hardware 117 of FIG. 8, for example. In performing operation S407 using the hardware 117 of FIG. 8, the hash matcher 211 matches the hash value of the header of the packet data and the hash value of the header of the rule pattern, and if the hash values are matched with each other, the light pattern matcher 217 matches the middle value and the tail value of the header of the packet data and the middle value and the tail value of the header of the rule pattern. If the middle values and the tale values are matched with each other, the firewall engine 130 performs an exact matching operation to match the whole of the header of the packet data and the whole of the header of the rule pattern. If the exact matching is successful, the firewall engine 130 blocks the packet data, as will be explained. If the packet data is matched with the rule pattern, the packet data is allowed or blocked according to the rule pattern (operation 409). On the other hand, if the packet data is not matched the rule pattern, it is determined that the matching is not successful and thus the packet data is passed.

Figure 12:
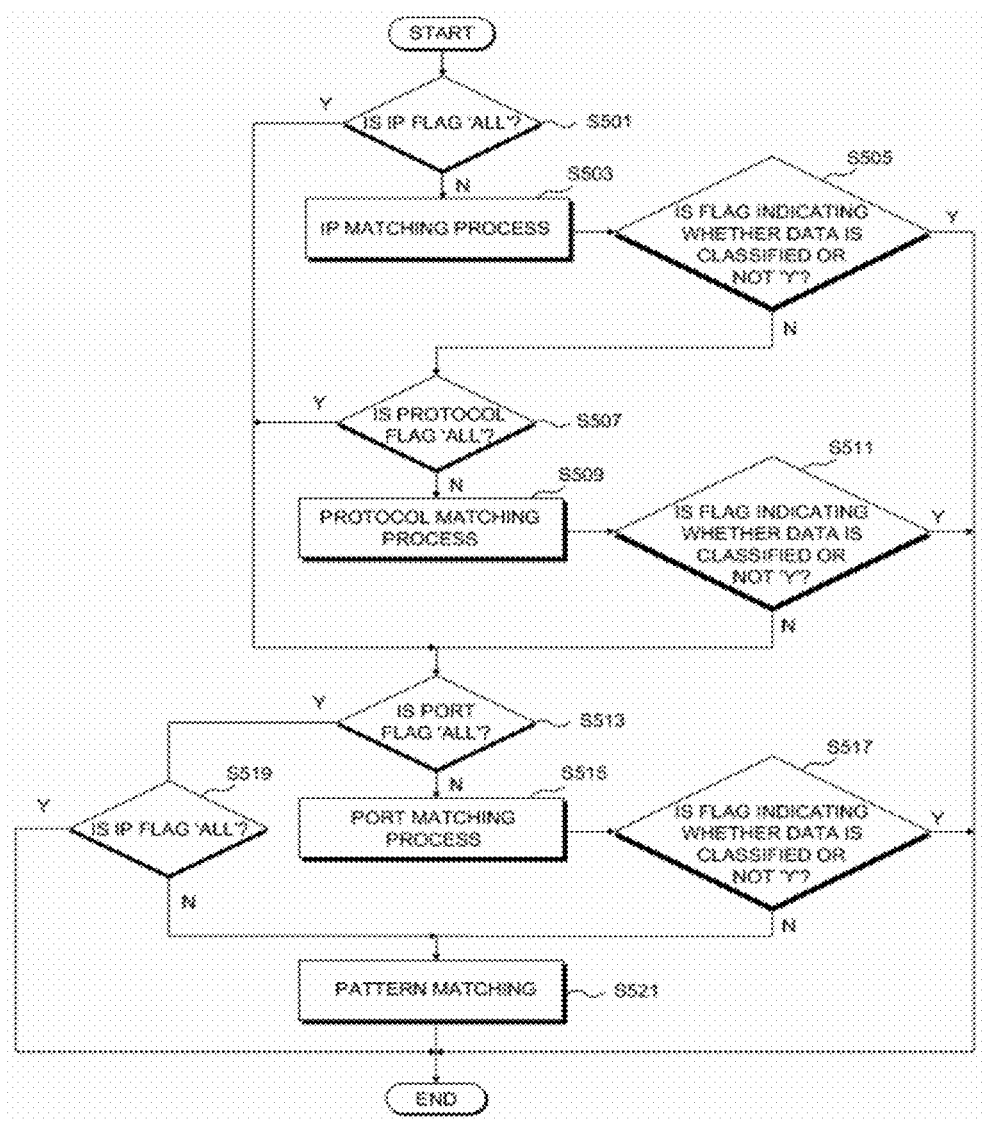
FIG. 12 is a flowchart illustrating a packet classifying process according to an exemplary embodiment.

FIG. 12 is a flowchart illustrating a packet classifying process according to an exemplary embodiment.

Referring to FIG. 12, a packet classifying process includes operations S501 to 519, and, if it is determined that packet data is to be pattern-matched as a result of the packet classifying process, the firewall engine performs a pattern matching operation (operation S521). According to an exemplary embodiment, the firewall engine performs the packet classifying process using at least one flag.

The flag may include an IP flag, a protocol flag, a port flag, a flag indicating whether packet data is classified in relation to IP matching, a flag indicating whether packet data is classified in relation to protocol matching, and a flag indicating whether packet data is classified in relation to port matching. In this embodiment, the firewall engine may set a value of each flag with reference to the rule pattern DB and/or the sub matcher table shown in (c) of FIG. 9. The firewall engine may store the flag value in the system register 230 and also may store the flag value in a storage unit (not shown) other than the system register 230. The firewall engine sets the IP flag to 'All' if there is at least one rule pattern that allows all IP addresses to pass among the rule patterns. In the same way, the firewall engine sets the protocol flag to 'All' if there is at least one rule pattern that allows all protocols to pass among the rule patterns. Also, the firewall engine sets the port flag to 'All' if there is at least one rule pattern that allows all ports to pass among the rule patterns. The above operations of setting the flags may be performed before the packet classifying process is performed or while the packet classifying process is performed.

The flags indicating whether packet data is classified or not are set to 'Yes' or 'No' by the firewall engine during the IP matching operation, the protocol matching operation, and the port matching operation. This will be explained in detail below with reference to FIGS. 13, 14, and 15.

If the firewall engine receives packet data to be filtered, the firewall engine determines whether the IP flag is 'All' or not by checking the IP flag (operation S501). If the IP flag is not 'All', an IP matching process is performed with respect to the packet data (operation S503). The IP matching process will be explained in detail with reference to FIG. 13 below.

After the IP matching process is completed, if the flag indicating whether packet data is classified in relation to IP matching is set to 'N' (operation S505: N), it is determined whether the protocol flag is 'All' or not (operation S507).

The flag indicating whether packet data is classified in relation to IP matching is set to one of 'Y' and 'N' during the IP matching process, as will be explained with reference to FIG. 13. If the protocol flag is not 'All', the firewall engine performs a protocol matching process (operation S509). The protocol matching operation will be explained in detail with reference to FIG. 14 below.

After the protocol matching process is completed, if the flag indicating whether the packet is classified in relation to protocol matching is set to 'N' (operation S511: N), the firewall engine determines whether the port flag is set to 'All' or not (operation S513). If the port flag is set to 'All', it is determined whether the IP flag is set to 'All' (operation S519). If the IP flag is set to 'All', the firewall engine finishes the rule pattern matching operation with respect to the packet data. However, if the IP flag is not 'All' (operation S519: N), a pattern matching operation is performed (operation S521).

If the port flag is not set to 'All' (operation S513: N), the firewall engine performs a port matching process (operation S515). The port matching process will be explained in detail with reference to FIG. 15 below.

After the port matching process is completed, if the flag indicating whether packet data is classified in relation to port matching is set to 'N'(operation S517: N), a pattern matching operation is performed with respect to the packet data (operation S521).

On the other hand, if the flags indicating whether packet data is classified or not are set to 'Y' (operation S505: Y, operation S511: Y, and operation S517: Y), the firewall engine finishes the rule pattern matching operation with respect to the packet data.

Figure 13:
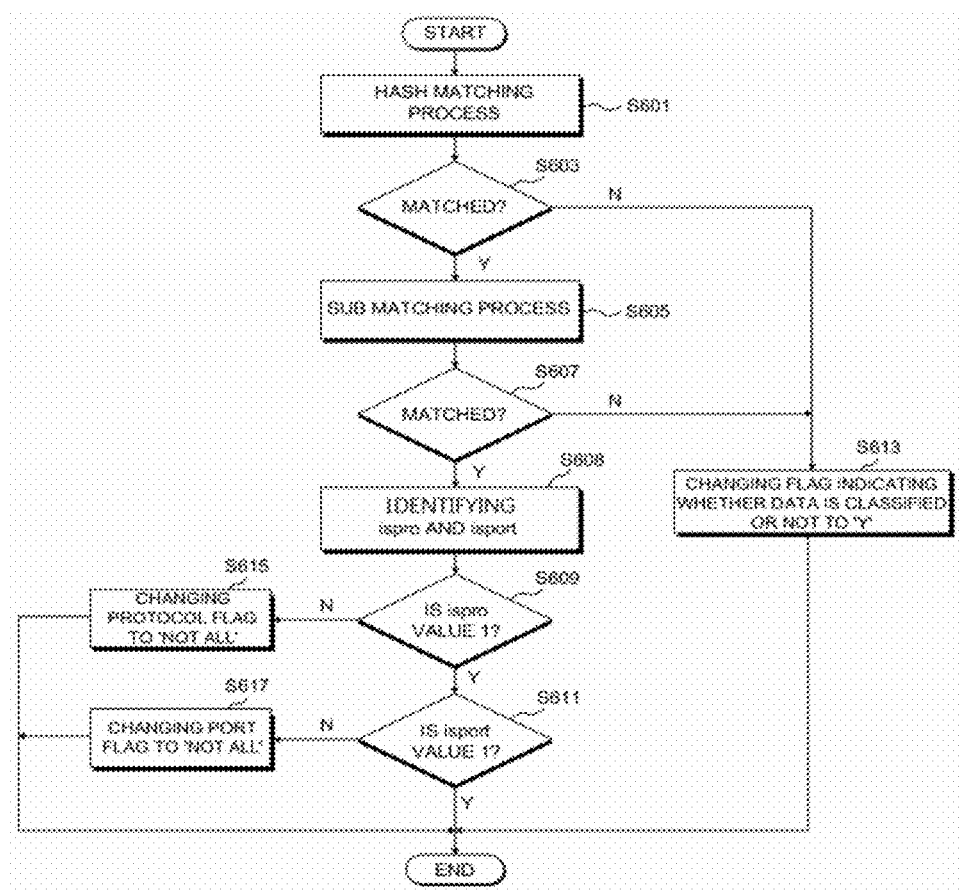
FIG. 13 is a flowchart illustrating an Internet Protocol (IP) matching process according to an exemplary embodiment.

FIG. 13 is a flowchart illustrating an IP matching process according to an exemplary embodiment.

The firewall engine performs a hash matching process to determine whether a hash value of an IP address included in a header of packet data is matched with a hash value of an IP address of rule patterns included in the rule pattern DB (operation S601). According to an exemplary embodiment, the hash matcher 211 of the firewall engine matches the hash value of the IP address included in the header of the packet data and the hash matcher table shown in (b) of FIG. 9. For example, if the hash value of the IP address included in the header of the packet data is 'X', it is determined that the hash values are matched with each other since the hash matcher table displays that 'X' exists.

If matching is not achieved by the hash matching process (operation S603), the firewall engine changes the flag indicating whether packet data is classified or not in relation to IP matching to 'Y' meaning that the packet is classified (operation S613). On the other hand, if matching is achieved by the hash matching process (operation S603), the firewall engine performs a sub matching process to perform a matching operation with respect to the packet using the sub matcher table (operation S605). According to an exemplary embodiment, the light pattern matcher 217 of the firewall engine matches a middle value and a tail value of the IP address included in the header of the packet data and the sub matcher table shown in (c) of FIG. 9.

If matching is not achieved by the sub matching process (operation S607), the firewall engine changes the flag indicating whether packet data is classified or not in relation to IP matching to 'Y' meaning that the packet is classified (operation S613). On the other hand, if matching is achieved by the sub matching process (operation S607), the firewall engine identifies an ispro value indicating whether a rule applicable to all protocols exists in the sub matcher table or not, and an isport value indicating whether a rule applicable to all ports exists (operation S608). If the isport value is '1', there is at least one rule pattern applicable to all ports among the rule patterns of the rule pattern DB, and if the ispro value is '1', there is at least one rule applicable to all protocols among the rule patterns of the rule pattern DB.

If the ispro value does not equal to '1' in operation S608, the firewall engine changes the protocol flag to 'Not All' (operation S615). On the other hand, if the ispro value is '1', the firewall engine determines whether the isport value equals to 1 or not (operation S611).

If the isport value does not equal to '1', the firewall engine changes the port flag to 'Not All' (operation S617).

The flags indicating whether packet data is classified or not, the protocol flags, the port flags in the embodiment of FIG. 13 correspond to the flag indicating whether packet data is classified or not used in operation S505 of FIG. 12, the protocol flag used in operation S507, and the port flag used in operation S513, respectively.

Figure 14:
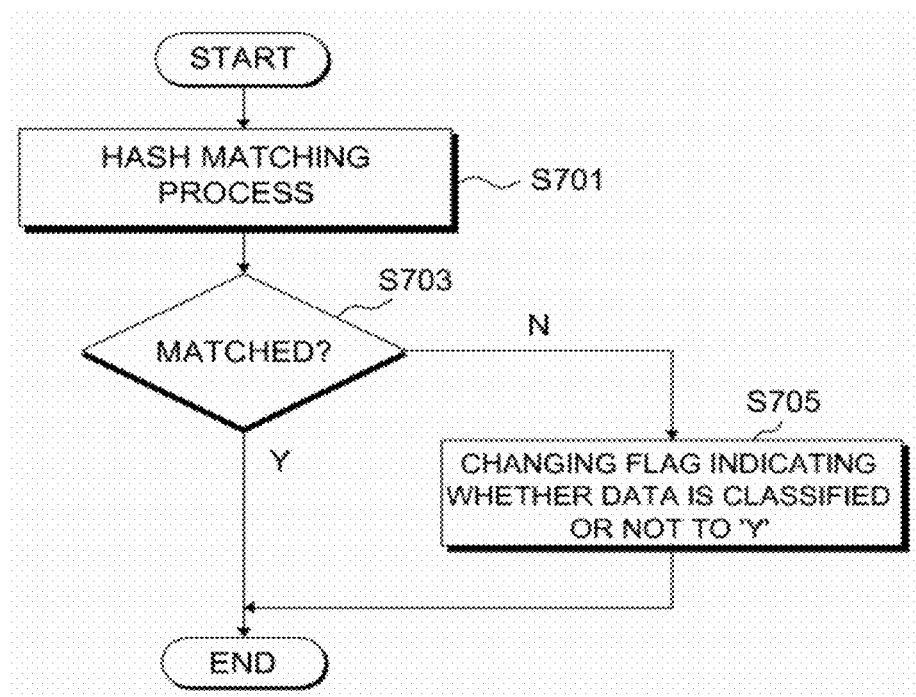
FIG. 14 is a flowchart illustrating a protocol matching process according to an exemplary embodiment.

FIG. 14 is a flowchart illustrating a protocol matching process according to an exemplary embodiment.

The firewall engine performs a hash matching process to determine whether a hash value of a protocol included in a header of packet data is matched with a hash value of a protocol of rule patterns included in the rule pattern DB (operation S701). According to an exemplary embodiment, the hash matcher 211 of the firewall engine matches the hash value of the protocol included in the header of the packet data and the hash matcher table shown in (b) of FIG. 9. For example, if the hash value of the protocol included in the header of the packet data is 'Z', it is determined that the hash values are not matched with each other since the hash matcher table displays that 'Z' does not exist.

If matching is achieved by the hash matching process (operation S703), the firewall engine finishes the hash matching process and performs a next operation (for example, operation S511 of FIG. 12). On the other hand, if matching is not achieved by the hash matching process, the firewall engine changes the flag indicating whether packet data is classified or not in relation to protocol matching 'Y' meaning that the packet is classified (operation S705). The flag indicating whether packet data is classified or not corresponds to the flag indicating whether packet data is classified or not used in operation S511 of FIG. 12.

In the present exemplary embodiment, a verification process is performed only by the hash matching process without performing a sub matching process, since the number of cases in which the protocol matching is performed is low. However, this is merely an example and the sub matching process may be performed in the case of the protocol matching.

Figure 15:
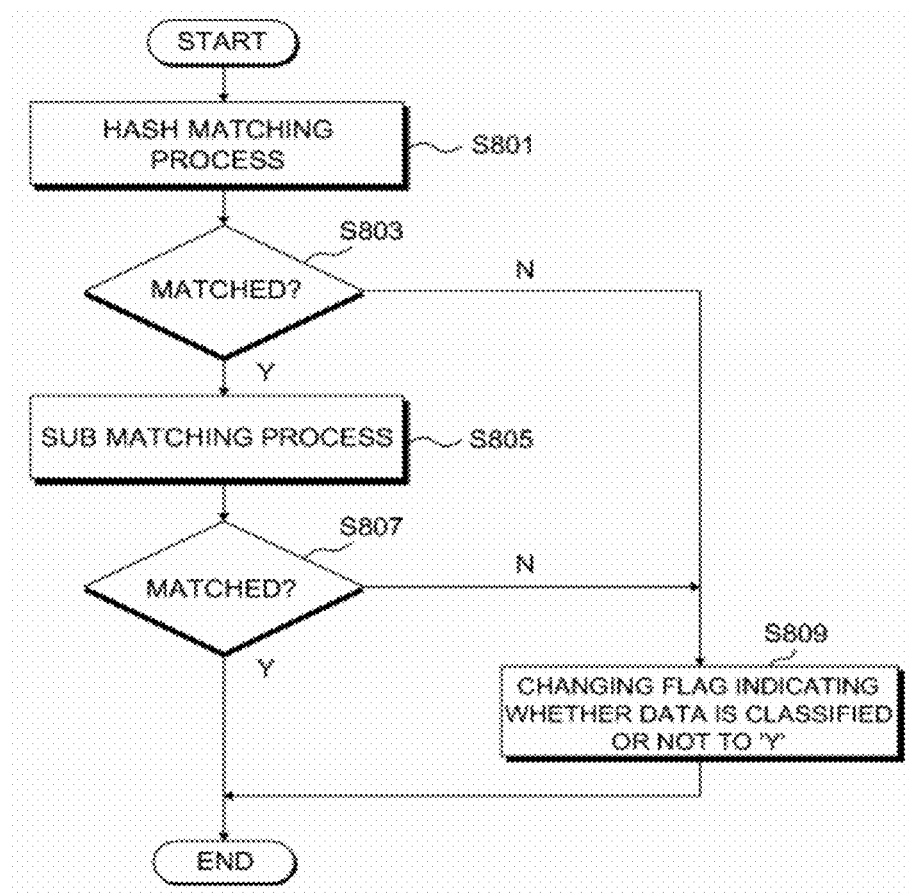
FIG. 15 is a flowchart illustrating a port matching process according to an exemplary embodiment.

FIG. 15 is a flowchart illustrating a port matching process according to an exemplary embodiment.

The firewall engine performs a hash matching process to determine whether a hash value of a port included in a header of packet data is matched with a hash value of a port of rule patterns included in the rule pattern DB (operation S801). According to an exemplary embodiment, the hash matcher 211 of the firewall engine matches the hash value of the port included in the header of the packet data and the hash matcher table shown in (b) of FIG. 9. For example, if the hash value of the protocol included in the header of the packet data is 'A', it is determined that the hash values are matched with each other since the hash matcher table displays that 'A' exists.

If matching is not achieved by the hash matching process (operation S803), the firewall engine changes the flag indicating whether packet data is classified or not in relation to port matching to 'Y' meaning that the packet is classified (operation S809).

If matching is achieved by the hash matching process (operation S803), the firewall engine performs a sub matching process with respect to the packet data (operation S805). According to an exemplary embodiment, the light pattern matcher 217 of the firewall engine matches the hash value of the IP address and the hash value of the protocol included in the header of the packet data and the sub matcher table shown in(c) of FIG. 9.

If matching is not achieved by the sub matching process (operation S807), the firewall engine change the flag indicating whether packet data is classified or not in relation to port matching is changed to 'Y' meaning that the packet is classified (operation S809). On the other hand, if matching is achieved by the sub matching process, the firewall engine finishes the port matching process and performs operation S517 of FIG. 12.

The flag indicating whether packet data is classified or not used in operation S809 of FIG. 15 corresponds to the flag indicating whether packet data is classified or not used in operation S517 of FIG. 12.

Figure 16:
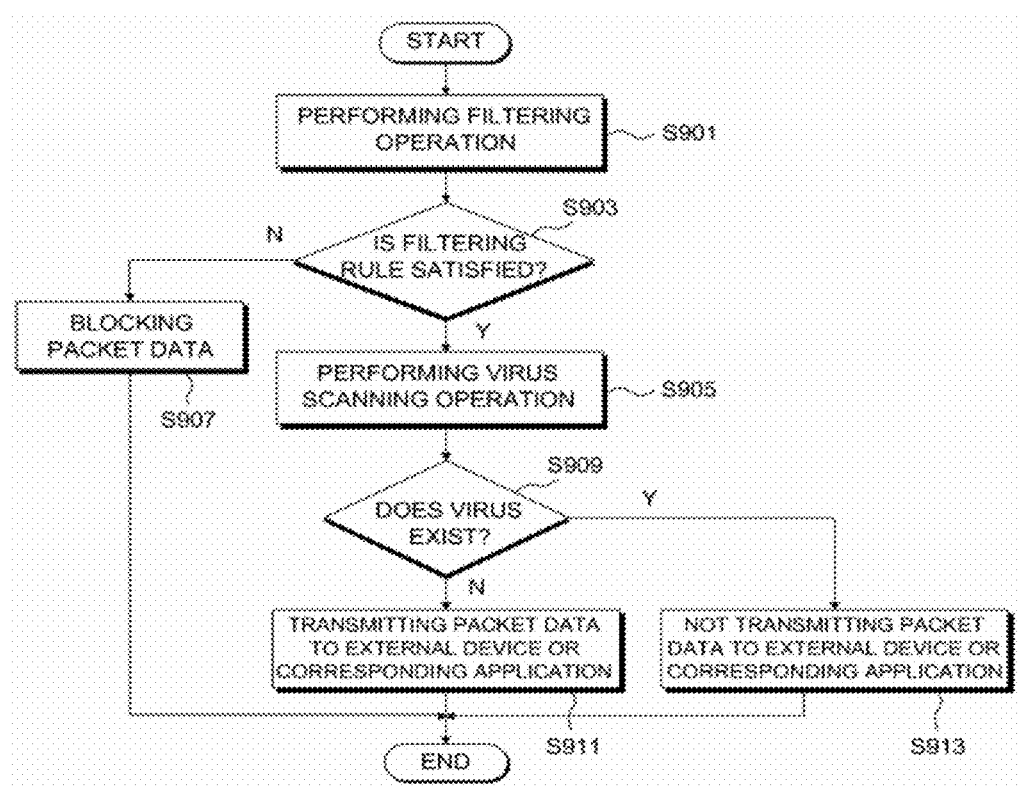
FIG. 16 is a flowchart illustrating an operating method of an anti-malware system according to an exemplary embodiment.

FIG. 16 is a flowchart illustrating an operating method of an anti-malware processor or system according to an exemplary embodiment. The operating method of FIG. 16 is realized by, but not limited to, any one of the anti-malware systems of FIGS. 4 to 6.

Referring to FIG. 16, if the firewall engine receives packet data, the firewall engine performs a filtering operation with respect to the packet data (operation S901).

If the packet data does not satisfy a filtering rule, e.g., if the packet data matches a rule pattern (operation S903-N), the firewall engine blocks the packet data (operation S907). Even if the packet satisfies the filtering rule, the firewall engine does not pass the packet data promptly and holds the packet data temporarily.

The anti-virus engine performs a virus scanning operation with respect to the packet data which is being on standby (operation S905). Moreover, prior to the scanning, the packet data may be converted into a format suitable for scanning, e.g., by the anti-malware manager. In this case, the anti-virus engine performs the virus scanning operation with respect to the converted packet data.

If a virus does not exist in the packet data as a result of scanning (operation S909-N), the packet data is transmitted to an external device or a corresponding application (operation S911). If a virus exists in the packet data (operation S909-Y), the packet data is discarded or managed by a predetermined policy separately (operation S913).

The operating method of the anti-malware system of FIG. 16 may be modified as follows.

In a first method, if target data satisfies the filtering rule, the firewall engine determines whether the target data contains data to be scanned for viruses or not. Only if there is data to be scanned, operations S905-913 are performed.

In a second method, the anti-virus engine performs a virus scanning operation with respect to all packet data regardless of whether the packet data satisfies the filtering rule or not. In other words, if the packet data is received, the firewall engine and the anti-virus engine perform their respective operations.

FIGS. 17 to 20 are views to explain effects of the SOC according to exemplary embodiments.

Figure 17:
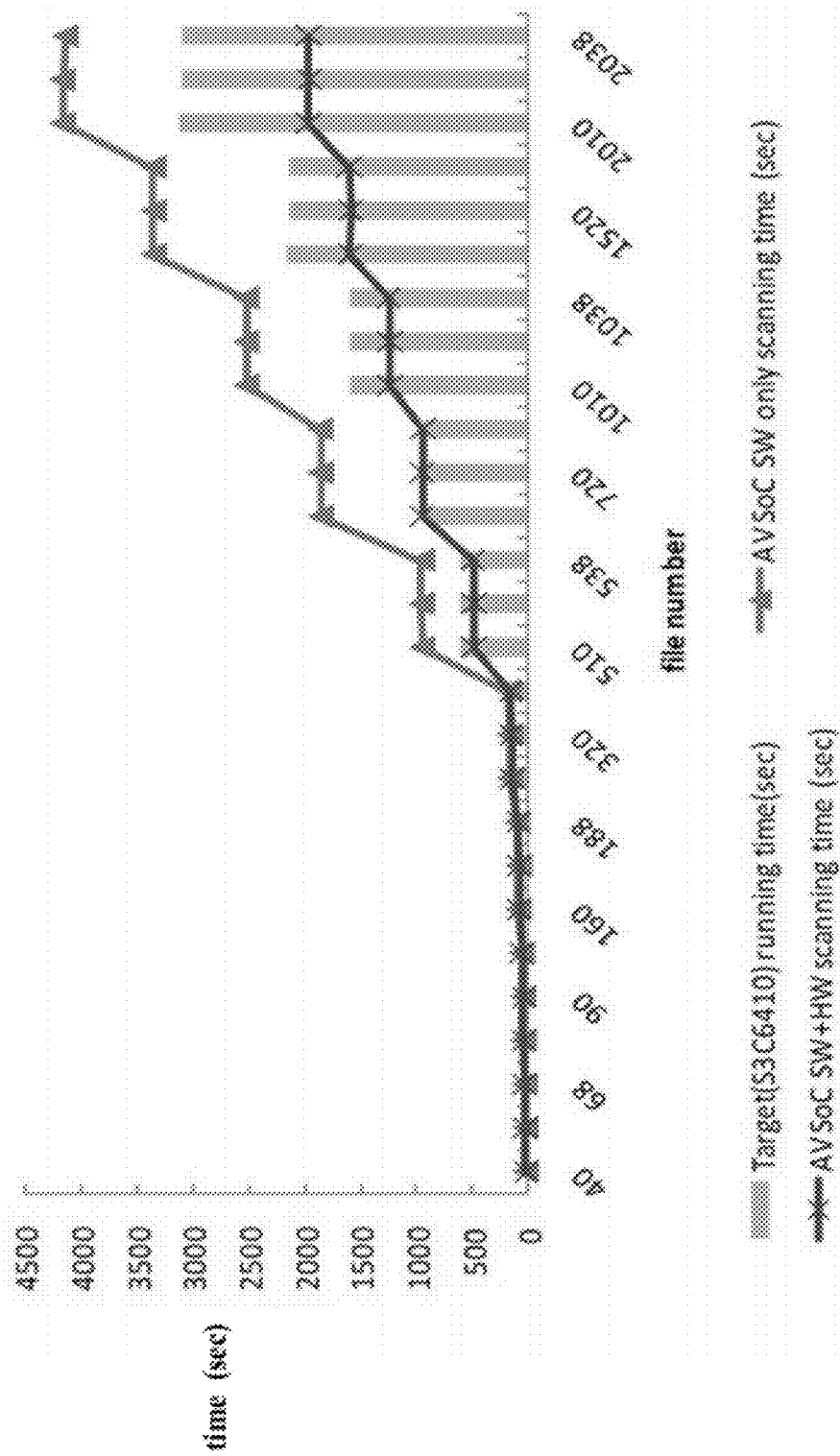
FIGS. 17 to 20 are views to explain effects of the SOC according to exemplary embodiments.

FIG. 17 illustrates a scanning speed when an anti-virus scanning engine using the same algorithm is tested for a malware scanning operation on an application layer (hereinafter, referred to as 'TEST 1') and a scanning speed when a SOC-based anti-virus scanning engine is tested for a malware scanning operation.

In FIG. 17, the scanning speed of TEST 1 is expressed by bars and results of testing the SOC-based anti-virus engine are expressed by curved lines. The lower curved line indicates a result of performing malware scanning using a SOC-based anti-virus engine configured by software and hardware logic (hereinafter, referred to as 'TEST 2'), and the upper curved line indicates a result of performing malware scanning using a SOC-based anti-virus engine configured only by software (hereinafter, referred to as 'TEST 3').

In FIG. 17, TEST 1 uses a CPU of 800 MHz, and TEST 2 and TEST 3, which are done on an FPGA board for a SOC, use a CPU of 50 MHz. Accordingly, if the tests are done using a CPU having the same speed, it is expected that TEST 2 and TEST 3, which are done on the SOC, have much higher scanning speeds than that of TEST 1.

FIG. 17 indicates that TEST 2 requires more time to scan than TEST 1. However, if a difference in the speed of CPUs is considered, it is predicted that the SOC-based anti-malware engine configured only by software requires less time to scan than the anti-malware engine operated on the application layer.

On the other hand, TEST 3 has a higher scanning speed than TEST 1 despite the difference in the speed of the CPUs. In other words, if the number of files to be scanned exceeds 2,000, the scanning speed of TEST 3 is 1.5 times higher than the scanning speed of TEST 1.

Figure 18:
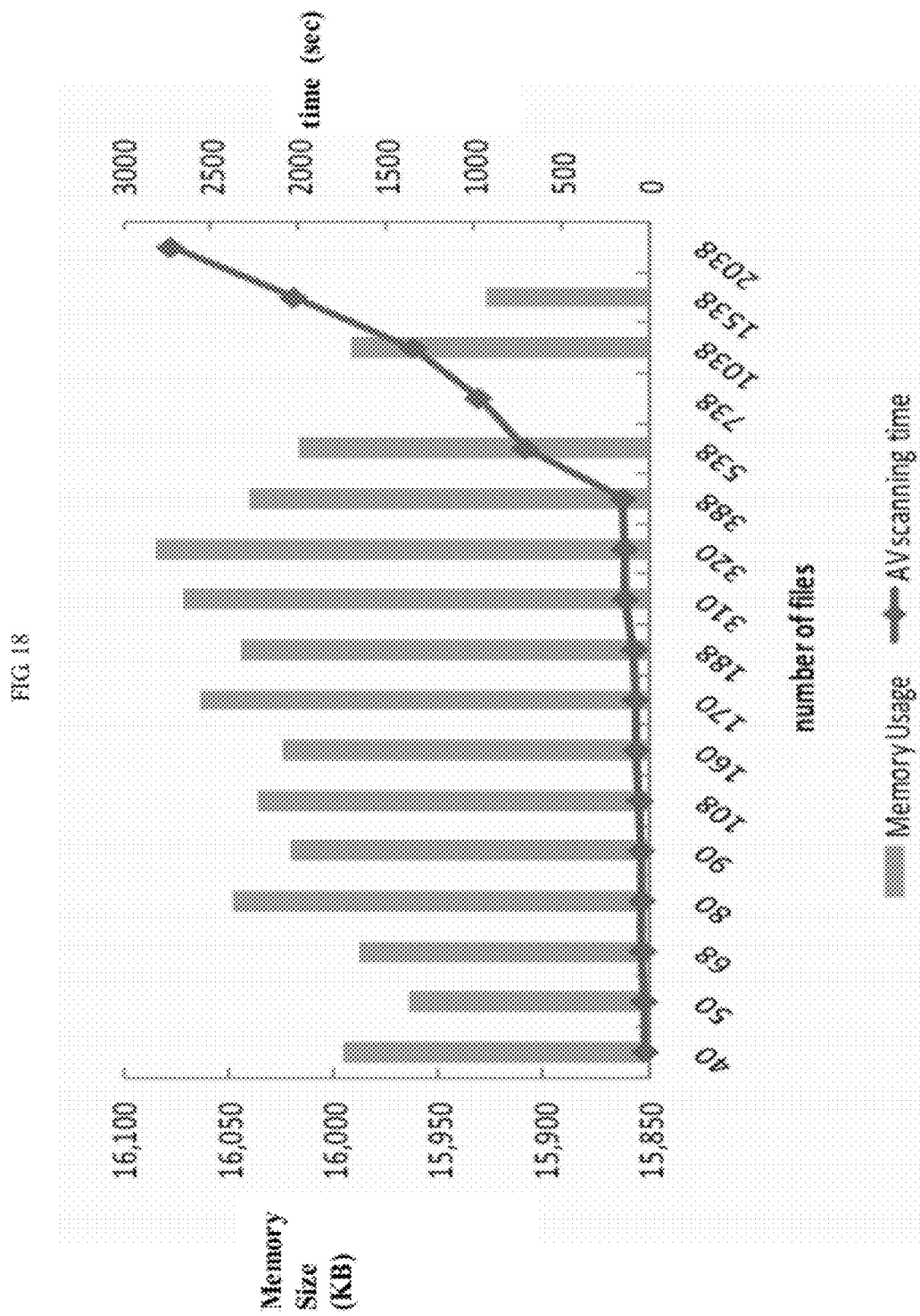

FIG. 18 illustrates memory usage and a scanning time when a malware scanning is performed using a mobile non-SOC-based and commercialized anti-virus engine.

In FIG. 18, bars indicate memory usage for the malware scanning, and a curved line indicates a time required for the malware scanning In FIG. 18, a CPU of 800 MHz is used. As shown in FIG. 18, the memory usage of the non-SOC-based anti-virus engine is high even in a state where the number of files is low.

Also, FIG. 18 indicates that the bar height is reduced as the number of files is more than 320. However, this is because of a swapping operation of the memory. If the number of files to be scanned increases to a point higher than the memory is able to handle, the operating system may perform a swapping operation of the memory. The swapping operation may increase the scanning time and consequently battery consumption increases.

Figure 19:
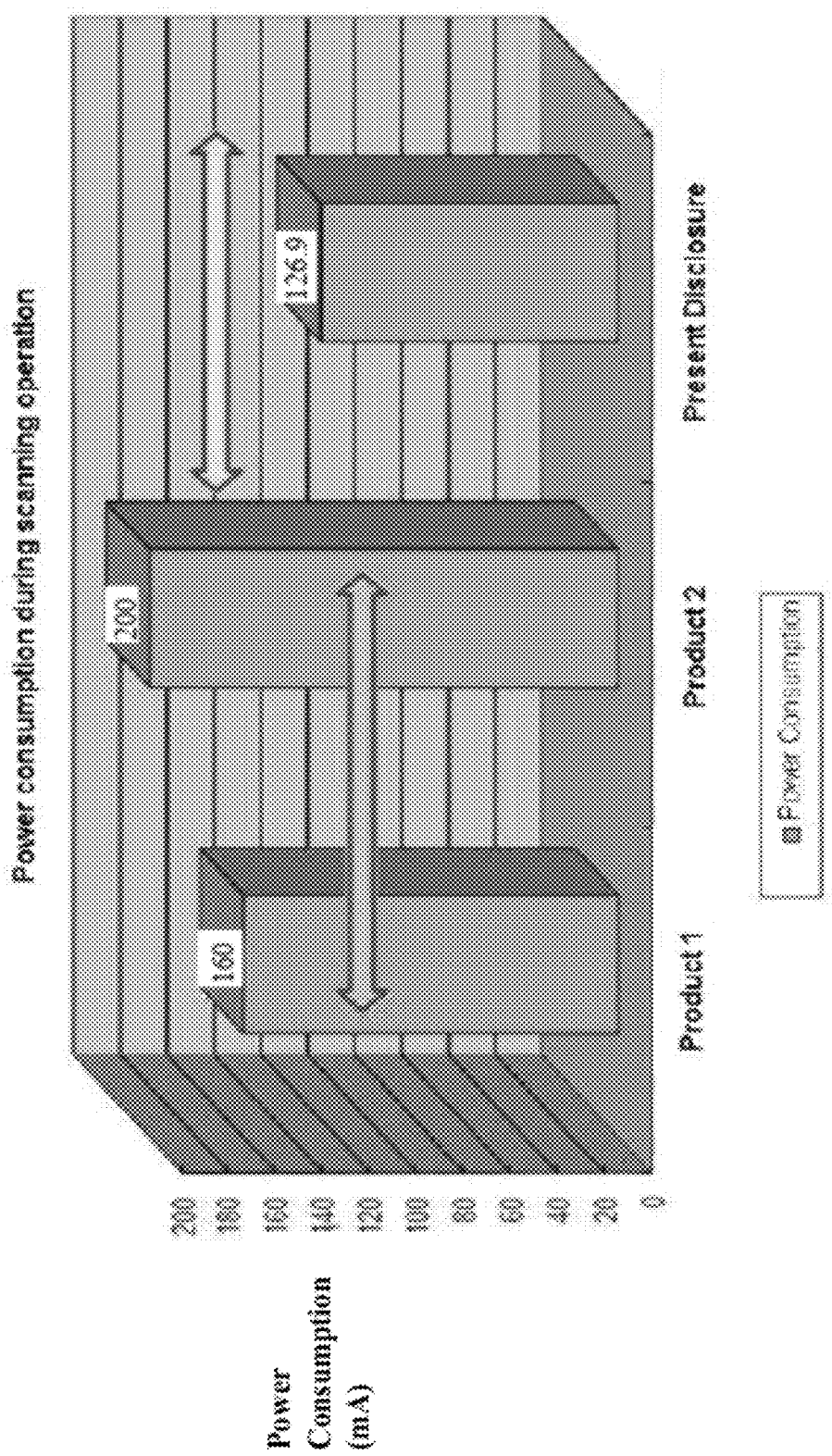

FIG. 19 illustrates power consumption of anti-virus engines, as a result of testing commercialized products and a SOC-based anti-virus engine according to an exemplary embodiment.

Referring to FIG. 19, the commercialized product 1 and the commercialized product 2 to be compared are anti-virus engines realized only by software, not based on SOC, and consume about 160 mA and about 200 mA, respectively. On the other hand, the SOC-based anti-virus scanning engine according to an exemplary embodiment is an engine configured by software and hardware logic and consumes about 126.9 mA.

Figure 20:
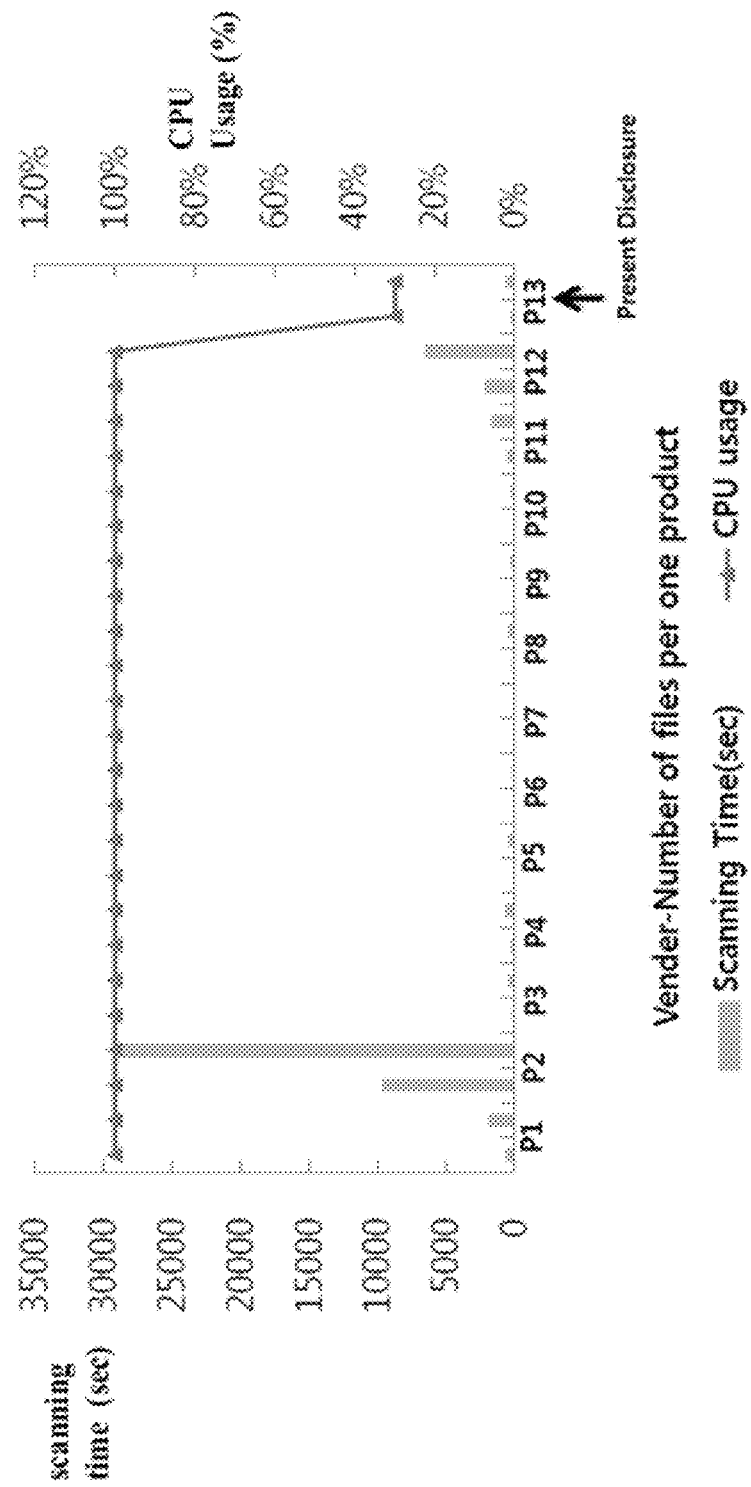

FIG. 20 illustrates a malware scanning time and a CPU usage time, as a result of testing products for use in a mobile phone and a SOC-based anti-virus engine according to an exemplary embodiment.

FIG. 20 illustrates results of testing the products P1, P2, P3, P4, P5, P6, P7, P8, P9, P10, P11, P12 and the SOC-based anti-virus engine P13 according to an exemplary embodiment two times for each product with different numbers of files to be scanned.

In FIG. 20, the CPU usage of the commercialized products is almost 100% and is much higher than that of the SOC-based anti-virus engine P13. As the CPU usage and the scanning time increase, battery consumption increases. Therefore, the present exemplary embodiment has an effect of reducing battery consumption.

In addition, the preset exemplary embodiment P13 is tested using an FPGA board having a CPU of 50 MHz, whereas the products use CPUs of several hundred MHz to several GHz.

Therefore, it is predicted that the present exemplary embodiment is greatly superior to the products in view of the CPU usage or the scanning time if the test is done under the same condition.

In the above-described exemplary embodiments, the anti-malware system is configured based on the SOC. However, this is merely an example and the present disclosure is not necessarily configured based on the SOC only. For example, the anti-malware system may be realized in the form of an application that is installed in a mobile device or a personal computer. For example, the manager 160, the anti-virus engine 150, and the firewall engine 130 illustrated in FIGS. 1 to 6 may be realized in the form of software installed in the application unit 300.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of an anti-malware processor, the method comprising:
    filtering by a first logic unit of the processor, input data based on a rule; and
    scanning by a second logic unit of the processor, for malware in the data, the filtering and the scanning being performed at a same time,
    wherein the input data is packet data, the method further comprising determining whether the packet data contains data to be scanned for malware,
    wherein the scanning is performed only if it is determined that the packet data contains data to be scanned for malware,
    wherein, if the packet data does not match the rule as a result of the filtering and if it is determined that the packet data does not contain the malware as a result of the scanning, the packet data is transmitted to an external device or an application unit,
    wherein, if the packet data does not match the rule as a result of the filtering, but if it is determined that the packet data contains the malware as a result of the scanning, the packet data is not transmitted to an external device or an application unit, and
    wherein the method further comprises:
        if it is determined that the packet data does not match the rule in the filtering, storing the packet data in a standby buffer; and
        if it is determined that the packet data not matching the rule contains the data to be scanned for malware in the determining, copying the packet data to an auxiliary buffer and storing the packet data in the auxiliary buffer.

2. The method of claim 1, wherein the filtering overlaps with the scanning in time.

3. The method of claim 2, wherein the scanning starts before the filtering is completed.

4. The method of claim 1, wherein the processor is a system-on-chip (SOC).

5. The method as claimed in claim 1, wherein the input data is packet data and the method further comprising converting the packet data to be scanned for malware into data of a format for the scanning,
    wherein the scanning scans the converted packet data.

6. The method as claimed in claim 1, further comprising, if it is determined that the packet data contains the data to be scanned for malware in the determining, determining a type of the data to be scanned for malware.

7. The method as claimed in claim 1, wherein the input data is packet data and the filtering comprises:
    first matching the packet data and a rule pattern; and
    determining whether to allow or block the packet data according to a result of the first matching,
    wherein the scanning comprises:
    second matching the packet data and a predetermined malware pattern; and
    determining whether the packet data contains the malware according to a result of the second matching.

8. An anti-malware device comprising:
    a processor comprising:
        a firewall engine which comprises first logic units that filter input data based on a rule, and determines whether the input data contains data to be scanned for malware; and
        an anti-malware engine which comprises second logic units that scan for malware in the input data, if the firewall engine determines that the input data contains the data to be scanned for malware,
    wherein the firewall engine filters and the anti-malware engine scans at a same time
    wherein the input data is packet data, the firewall engine determines whether the packet data contains data to be scanned for malware, and the second logic units scan for the malware only if the firewall engine determines that the packet data contains the data to be scanned for malware,
    wherein the anti-malware device further comprises a standby buffer and an auxiliary buffer,
    wherein the firewall engine stores the data in the standby buffer if it is determined that the packet data does not match the rule, and stores the data in the auxiliary buffer if the packet data not matching the rule contains the data to be scanned for malware.

9. The anti-malware device of claim 8, wherein the firewall engine filters during a first period of time and the anti-malware engine scans during a second period of time, wherein the first and second periods of time overlap.

10. The anti-malware device of claim 8: wherein the anti-malware engine starts to scan before the firewall engine completes filtering.

11. The anti-malware device as claimed in claim 8, wherein the firewall engine determines whether the data contains the data to be scanned for malware, only if the data does not match the rule.

12. The anti-malware device as claimed in claim 8, further comprising an anti-malware manager which converts the data to be scanned for malware into data of a format for the anti-malware engine,
    wherein the anti-malware engine scans the converted data.

* * * * *